(12) United States Patent
Honda

(10) Patent No.: US 7,665,018 B2
(45) Date of Patent: Feb. 16, 2010

(54) INFORMATION PROCESSING APPARATUS, INFORMATION PROCESSING METHOD, AND PROGRAM

(75) Inventor: Kinya Honda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 833 days.

(21) Appl. No.: 11/212,011

(22) Filed: Aug. 25, 2005

(65) Prior Publication Data

US 2006/0048054 A1    Mar. 2, 2006

(30) Foreign Application Priority Data

Aug. 31, 2004    (JP)    ............................. 2004-252896

(51) Int. Cl.
*G06F 17/00*    (2006.01)
(52) U.S. Cl. ..................................... 715/274
(58) Field of Classification Search ................ 715/200, 715/243, 252, 255, 273, 274
See application file for complete search history.

(56) References Cited

U.S. PATENT DOCUMENTS

| 5,465,299 | A  | * | 11/1995 | Matsumoto et al. | ......... | 713/176 |
|---|---|---|---|---|---|---|
| 6,826,727 | B1 | * | 11/2004 | Mohr et al. | .................. | 715/235 |
| 6,915,454 | B1 | * | 7/2005 | Moore et al. | ................... | 714/38 |
| 7,272,789 | B2 | * | 9/2007 | O'Brien | ....................... | 715/247 |
| 7,373,593 | B2 | * | 5/2008 | Uchida | ........................ | 715/210 |
| 7,379,950 | B2 | * | 5/2008 | Sato et al. | ................. | 707/104.1 |
| 2002/0004805 | A1 | * | 1/2002 | Nojima et al. | ............... | 707/520 |
| 2003/0106022 | A1 | * | 6/2003 | Goodacre et al. | ........... | 715/513 |
| 2003/0229845 | A1 | * | 12/2003 | Salesin et al. | ................ | 715/500 |
| 2004/0066530 | A1 | * | 4/2004 | Wu et al. | .................... | 358/1.15 |
| 2004/0135813 | A1 | * | 7/2004 | Kanai | .......................... | 345/781 |
| 2005/0046630 | A1 | * | 3/2005 | Jacob et al. | .................. | 345/475 |
| 2005/0102628 | A1 | * | 5/2005 | Salesin et al. | ................ | 715/764 |
| 2005/0104897 | A1 | * | 5/2005 | Walker et al. | ................ | 345/620 |
| 2005/0172221 | A1 | * | 8/2005 | Kobashi et al. | ............. | 715/513 |
| 2005/0183008 | A1 | * | 8/2005 | Crider et al. | ................. | 715/517 |
| 2005/0198204 | A1 | * | 9/2005 | Takahashi | .................... | 709/219 |
| 2006/0010375 | A1 | * | 1/2006 | Salesin et al. | ................ | 715/517 |
| 2006/0031419 | A1 | * | 2/2006 | Huat | .......................... | 709/219 |
| 2006/0031761 | A1 | * | 2/2006 | Ohta | ........................... | 715/517 |
| 2006/0083428 | A1 | * | 4/2006 | Ghosh et al. | ................. | 382/224 |

(Continued)

FOREIGN PATENT DOCUMENTS

JP    03-189760 A    8/1991

(Continued)

OTHER PUBLICATIONS

Ko et al., Citrus: A Language and Toolkit for Simplifying the Creation of Structured Editors for Code and Data, ACM 2005, pp. 3-12.*

(Continued)

*Primary Examiner*—Cong-Lac Huynh
(74) *Attorney, Agent, or Firm*—Cowan, Liebowitz & Latman, P.C.

(57) ABSTRACT

In an information processing apparatus for dynamically changing a container layout in accordance with inserted contents data, a user is made to understand a change of layout by explicitly displaying a change before and after the layout change, thereby improving the convenience for the user in layout correction. More specifically, when the container layout is changed by inserted contents data, a container having a standard size before the layout change is explicitly displayed.

6 Claims, 27 Drawing Sheets

U.S. PATENT DOCUMENTS

2006/0200479 A1* 9/2006 Smith et al. .................. 707/100
2007/0024909 A1* 2/2007 Hanechak .................. 358/1.18

FOREIGN PATENT DOCUMENTS

| JP | 07-129658 | 5/1995 |
|----|-----------|--------|
| JP | 08-329262 A | 12/1996 |
| JP | 09-146948 A | 6/1997 |
| JP | 09-319742 A2 | 12/1997 |

OTHER PUBLICATIONS

Kopetzky et al., Visual Preview for Link Traversal on the World Wide Web, Google 1999, pp. 447-454.*

The above references were cited in a Jun. 30, 2008 Japanese Office Action issued in the counterpart Japanese Patent Application 2004-252896, a copy of which is enclosed.

* cited by examiner

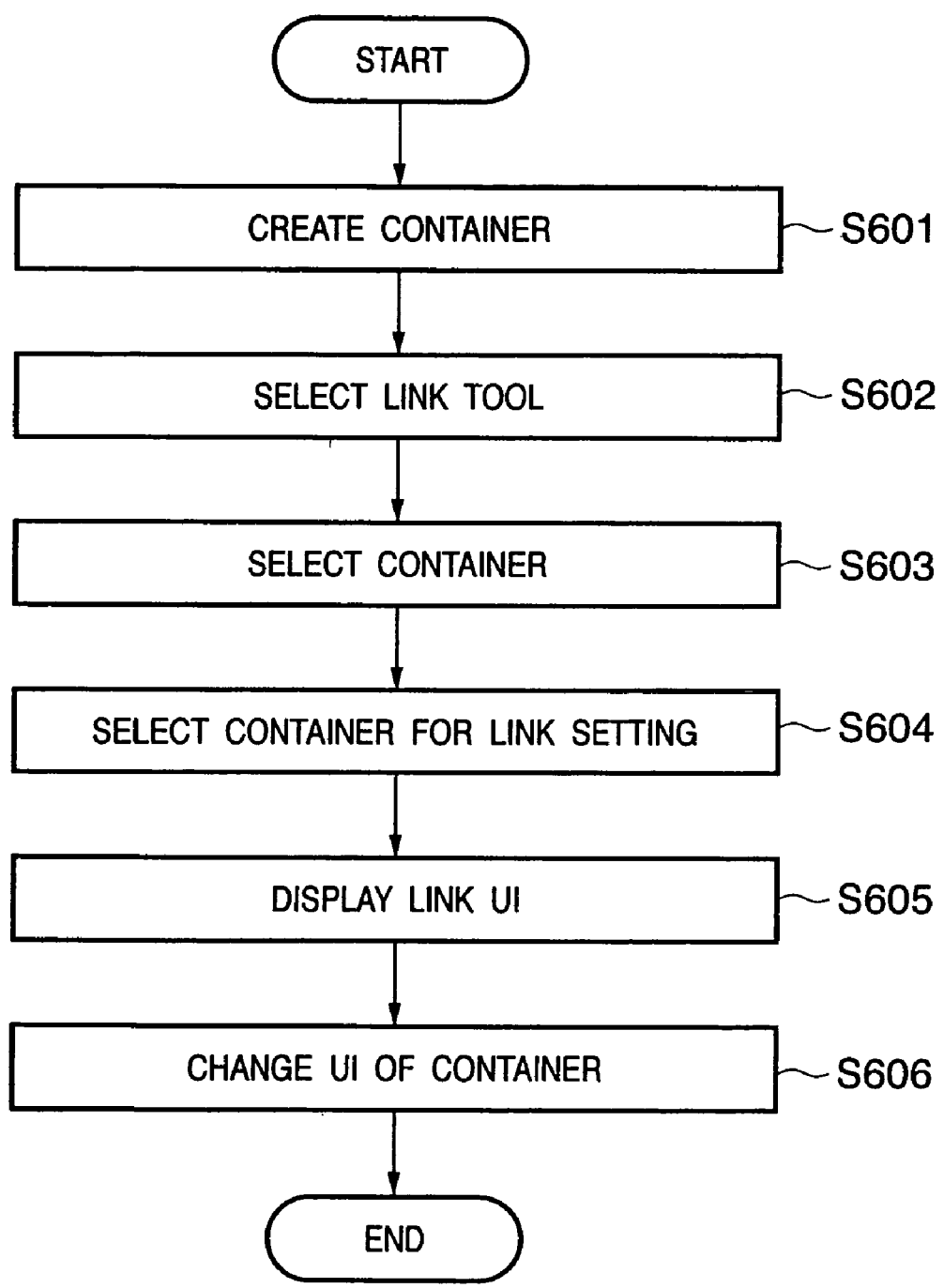

FIG. 7A
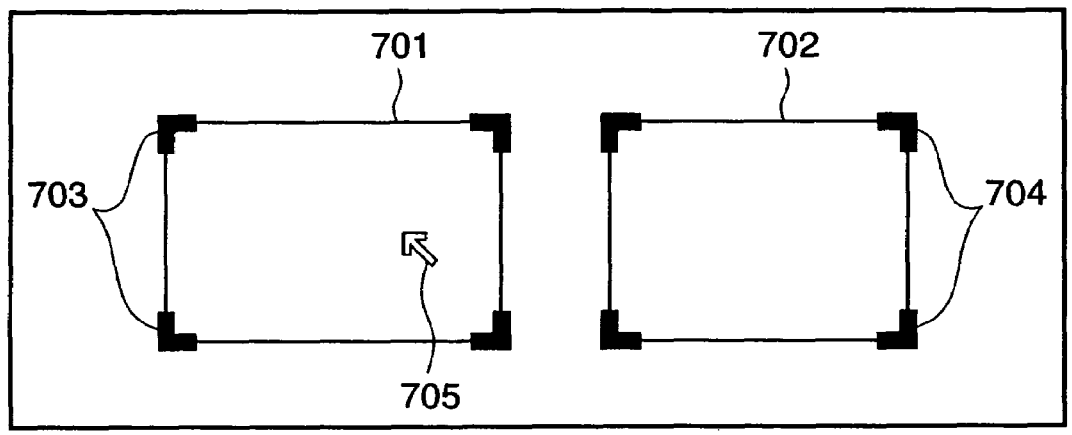
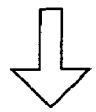
FIG. 7B
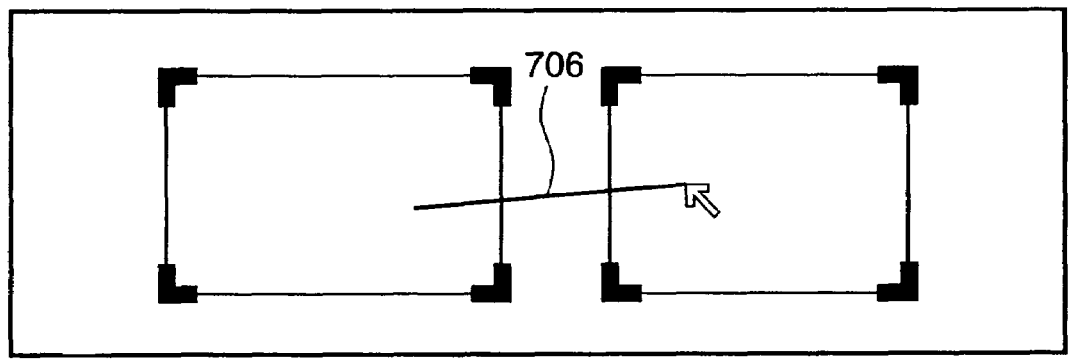
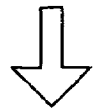
FIG. 7C
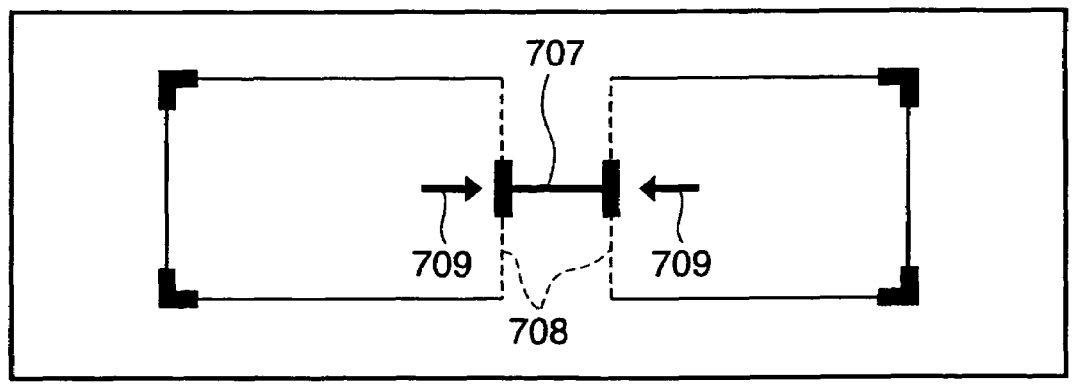

INFORMATION PROCESSING APPARATUS, INFORMATION PROCESSING METHOD, AND PROGRAM

FIELD OF THE INVENTION

The present invention relates to layout display of containers in an information processing apparatus which generates a document by inserting contents data in a plurality of containers on a document and controlling the layout of the containers in accordance with the contents data under predetermined control conditions.

BACKGROUND OF THE INVENTION

Since the merchandise life decreases recently due to increase in the variety of merchandise items, or the number of consumers with customization service orientation increases along with the widespread use of the Internet, the necessity of CRM (Customer Relationship Management) and one-to-one marketing has received a great deal of attention. These methods are very effective for purposes of increasing the customer satisfaction and winning and networking new customers.

The one-to-one marketing is a kind of database marketing. Personal attribute information such as age, sex, hobby, taste, and purchase log of each customer is stored as a database. The contents of the information are analyzed, and a proposal that meets customer's needs is presented. A typical method is variable print. Especially, along with the recent progress in DTP (DeskTop Publishing) technology and the spread of digital printers, variable print systems have been developed to output customized documents for each customer. It is then required to optimally lay out contents in different quantities for respective customers.

When such a customized document is to be created by a variable print system, containers are laid out in the document. A container is an object which indicates a rectangular partial area (sometimes called a field area) to draw a content (drawing content) in a database. According to the variable print system, after such containers are laid out in a document, the database and containers are associated with each other (each content in the database is associated with each container). With this operation, a customized document (document) can be created.

However, in the variable print system, text and image containers have fixed sizes. For this reason, when data of each content in the database is inserted in the container, and the data size is larger than the container size, text overlap or image clipping occurs. If the data size is smaller than the container size, a space is formed in the container.

To solve this problem, a system which dynamically changes the container layout in accordance with contents has been proposed. Since the container size is determined in accordance with the contents data amount of an inserted text or image, the above-described problem of overflow or space formation can be solved.

More specifically, a flexible container size is used such that the container size is increased in accordance with the amount of inserted contents data. For text data, the font size in a container is made flexible such that the font size is reduced in accordance with the amount of inserted data. Even when a text with a data size larger than the container size is inserted, the whole text data can be displayed in the container.

A layout system which partially implements the above-described technique is disclosed in Japanese Patent Laid-Open No. 7-129658. In the technique disclosed in Japanese Patent Laid-Open No. 7-129658, characters are input in a predetermined container. If characters exceeding the preset container size are input, the container size is increased accordingly. To compensate for the increase in container size, the size of an adjacent container is reduced.

In this layout system, a container is enlarged in accordance with the increase in the amount of text data input to the container. The size of an adjacent container decreases in accordance with the increase in container size. In the layout system, however, the container in which the text is input is continuously enlarged as long as the input continues. The adjacent container continuously reduces its size. Hence, no balanced layout can be implemented. Additionally, the above-described layout system does not assume variable print so inserting contents in respective containers is not taken into consideration.

There is a layout method considering variable data print, in which a fixed container is created, and contents data is inserted. However, when a container with a fixed size is used, and contents data exceeding the container size is inserted, overflow occurs. If the data is forcibly inserted by reducing the font size, the font may be too small.

As a layout method to solve the above problems, the size balance between a plurality of flexible containers associated with each other may be taken into consideration. The size of each container is changed in accordance with the size of contents data inserted. In addition, the change in the size of the associated containers are adjusted. With this layout processing, a layout result considering the size balance between containers can be obtained.

However, in the above-described layout method of adjusting the change amount of each container size, the layout of containers is automatically determined in accordance with insertion of contents data. Hence, the result of layout change can be confirmed only after the end of layout processing.

The user recognizes creation of an undesired layout only when the layout result is displayed. Correction of the layout must be done while confirming the association and sizes of the containers on a preset container setting window. To confirm the change from the initial container setting window, the preview window after the layout change and the container setting window used for initial setting must alternately be displayed and compared. This requires much time and effort for layout correction.

SUMMARY OF THE INVENTION

The present invention has been made in consideration of the above problems, and has as its object to provide an information processing apparatus for dynamically changing the container layout in accordance with inserted contents data, which can make a user understand a change of layout by explicitly displaying a container having a standard size before layout change, thereby improving the convenience for the user in layout correction.

It is another object of the present invention to make a user to grasp the reason why an undesired layout is obtained, by displaying layouts before and after change.

In order to achieve the above objects, an information processing apparatus according to the present invention has the following arrangement. That is, an information processing apparatus for generating a document in accordance with contents data inserted in a plurality of data areas on the document, comprising:

control unit configured to control a layout of the data areas on the basis of the contents data inserted in a data area having a standard size on the document; and display control unit configured to display, in a predetermined display area, the layout of the data areas controlled by the control unit, wherein the display control unit displays, in the predetermined display area, the data area having the standard size before control by the control unit.

According to the present invention, in the information processing apparatus for dynamically changing a container layout in accordance with inserted contents data, the standard size before the layout change is displayed so that the user can recognize the change before and after the layout. Since the user can understand the change of layout, the convenience for the user in layout correction increases.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a flowchart showing the flow of link setting processing;

FIGS. 7A to 7C are views showing an example of a UI in setting a link;

DETAILED DESCRIPTION OF THE PREFERRED EMBODIMENTS

Preferred embodiments of the present invention will now be described in detail in accordance with the accompanying drawings.

The outline of the embodiment will be described first. Generally, document creation by an automatic layout system can be classified into layout editing processing and automatic layout processing. In the former processing, containers are laid out on a document, and conditions to control the container layout when data are inserted are set. In the latter processing, data are inserted in containers, and the layout is controlled in accordance with the inserted data under set control conditions to generate a document.

In a host computer (information processing apparatus) according to each embodiment of the automatic layout system, automatic layout processing is executed, and a change of layout before and after data insertion is explicitly shown on a preview display window where containers with a layout controlled in accordance with inserted data are displayed.

Hence, a user can easily understand the change of layout upon data insertion. Even when a layout undesired by the user is obtained, he/she can easily correct the container layout or control condition setting in layout editing processing. The embodiments of the present invention will be described below in detail with reference to the accompanying drawings as needed.

First Embodiment

1. Arrangement Example of Automatic Layout System

Figure 1A:
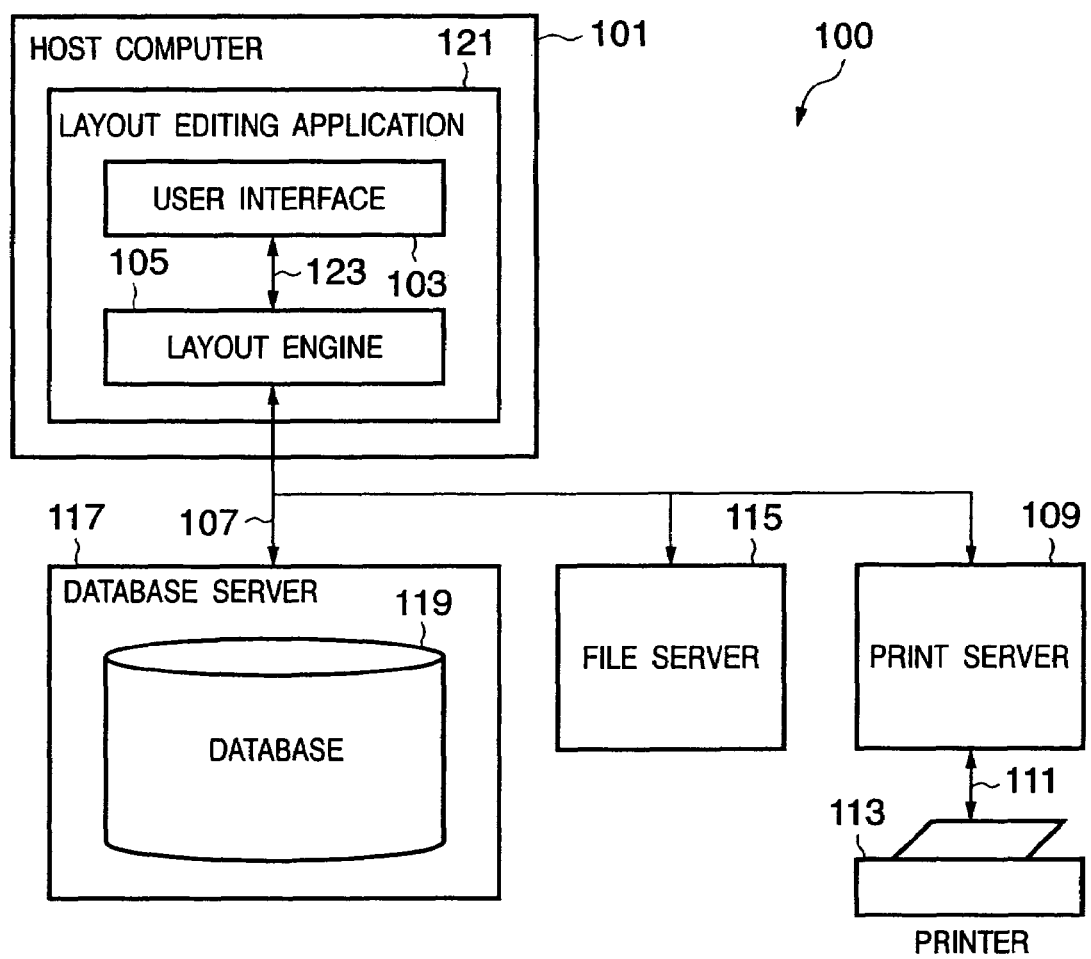
FIG. 1A is a block diagram showing an arrangement of an automatic layout system having a host computer according to an embodiment of the present invention.
Figure 1B:
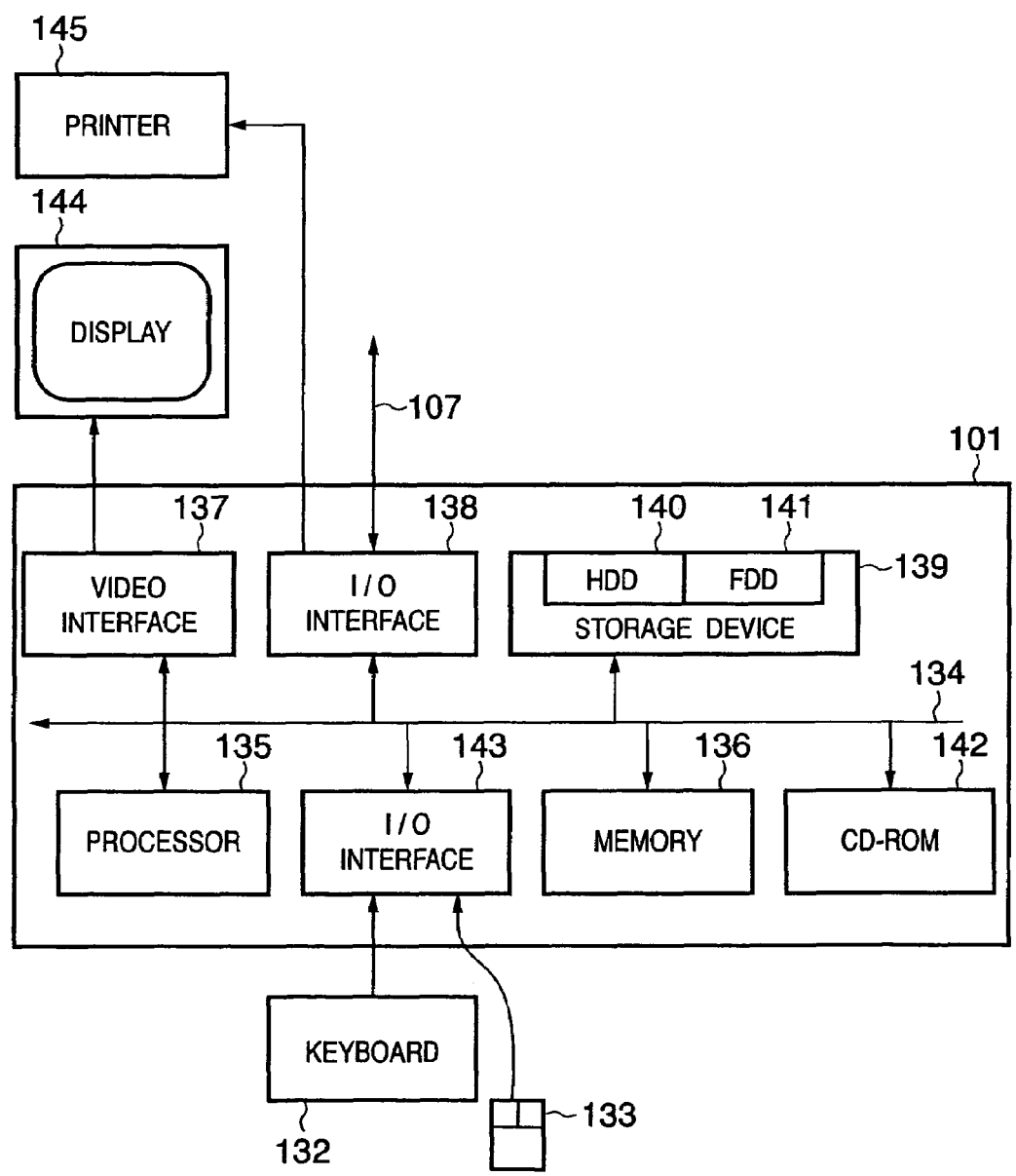
FIG. 1B is a block diagram showing the arrangement of the host computer according to the embodiment of the present invention in more detail.

The arrangement of an automatic layout system having a host computer (information processing apparatus) according to an embodiment of the present invention will be described with reference to FIGS. 1A and 1B. FIG. 1A is a block diagram showing an arrangement example of an automatic layout system 100. FIG. 1B is a block diagram showing the arrangement of a host computer (information processing apparatus) 101 shown in FIG. 1A in more detail.

Layout editing processing and automatic layout processing to be described in this embodiment are executed by the host computer 101 (including general-purpose computer modules). The software of a layout editing application program 121 executable on the automatic layout system 100 is wholly or partially executed by the host computer 101 to implement the layout editing processing and automatic layout processing.

The layout editing application program 121 is stored in a computer-readable medium. The layout editing application program 121 is loaded from the computer-readable medium to a memory 136 of the host computer 101 and executed. The computer-readable medium which stores such software or computer program is a computer program product. When the computer program product is used by a computer, an apparatus suitable for document creation or print of a created document is provided.

As shown in FIG. 1B, pointing devices such as a keyboard 132 and a mouse 133 serving as input devices are connected to the host computer 101 through an input/output interface 143. A display device 144 serving as an output device is connected through a video interface 137. A local printer 145 or the like may be connected through an input/output interface 138. The input/output interface 138 also has a function of connecting the host computer 101 to a network 107. With this arrangement, the host computer 101 can be connected to other computer apparatuses (e.g., a database server 117, file server 115, and print server 119) through the network. Typical examples of the network 107 are a local area network (LAN) and wide area network (WAN).

As shown in FIG. 1B, the host computer 101 includes at least one processor unit 135 and the memory unit 136 including, e.g., a semiconductor random access memory (RAM) or read-only memory (ROM). A storage device 139 includes a hard disk drive 140 and floppy (registered trademark) disk drive 141 capable of transmitting/receiving data to/from the computer-readably medium which stores the program. Although not illustrated in FIG. 1B, a magnetic tape drive can also be used as the storage device 139. A CD-ROM drive 142 is provided as a nonvolatile data source (the computer program may be provided by a CD-ROM, as a matter of course).

The host computer 101 uses the components 135 to 143 of the computer module 101, which communicate through an interconnection bus 134, typically in a form according to an operating system such as GNU/LINUX or Microsoft Windows (registered trademark) or by a method by the conventional operation mode of a computer system formed by a known associated technique. That is, the above-described components 135 to 143 are communicably connected through the bus 134 and used by the operating system installed in the host computer 101.

Examples of the host computer 101 shown in FIG. 1B are an IBM-compatible PC or Sparcstation available from SUN, or a computer system including them.

In this embodiment, the layout editing application program 121 is resident in the hard disk drive 140, and its execution or reading is controlled by the processor 135. Data fetched from the intermediate storage device of the layout editing application program 121 and the network 107 uses the semiconductor memory 136 in response to the hard disk drive 140.

As an example, the encoded program of the layout editing application 121 is stored in a CD-ROM or floppy (registered trademark) disk, loaded through the corresponding drive 142 to 141, and installed in the hard disk drive 140. As another example, the layout editing application program 121 may be loaded from the network 107 into the host computer 101 and installed in the hard disk drive 140.

The software may be loaded in the host computer 101 by using a magnetic tape, ROM, integrated circuit, magnetooptical disk, wireless communication using infrared rays between the host computer 101 and another device, a computer-readable card such as a PCMCIA card, or another appropriate computer including e-mail communication, an intranet, or the Internet having recording information on a WEB site. These are examples of computer-readable media. Any other computer-readable medium may be used.

Referring to FIG. 1A, the layout editing application 121 of the present invention causes the computer to execute automatic layout processing and layout editing processing and includes two software components, i.e., a layout engine 105 and user interface 103.

The layout engine 105 is a software component to execute automatic layout processing, in which data for each document is read out from data stored in the database 119 in accordance with setting of sizes and positions given to containers as rectangular partial areas, and the size and position of each container in which the readout data should be inserted are calculated on the basis of the read data and container setting. In this embodiment, the layout engine 105 also executes processing of drawing data assigned to a container to generate an image of a document. However, the present invention is not limited to this. The layout engine 105 may run as an application to determine the size and position of each partial area (container) and output drawing information to a printer driver (not shown). Accordingly, the printer driver may execute image drawing processing of a document and generate print data.

The user interface 103 allows a user to execute layout editing processing. More specifically, the user creates and moves containers through the user interface 103 to create a document template. In addition, the user interface 103 provides a mechanism to associate each container in the document template with data. The user interface 103 also makes it possible to do various kinds of settings (including link setting) for each container in the document template. The user interface 103 and layout engine 105 communicate with each other through a communication channel 123.

2. Another System Arrangement

Figure 2:
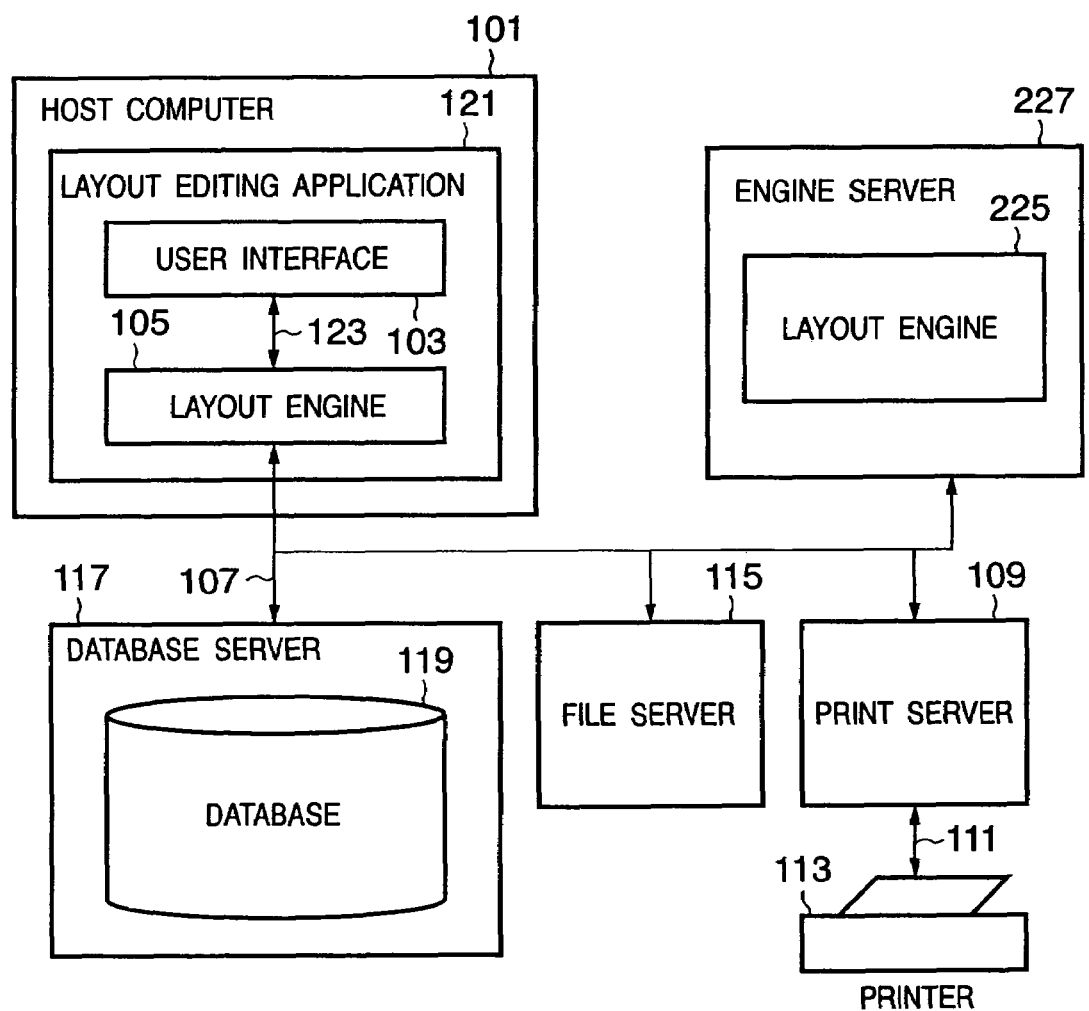
FIG. 2 is a block diagram showing another arrangement of the automatic layout system having the host computer according to the embodiment of the present invention.

FIG. 2 is the same block diagram as FIG. 1A except that an engine server 227 is added. A layout engine 225 stored in the engine server 227 is a separate version of the layout engine 105. As the engine server 227, a general computer is used. The layout engine 225 combines a document template stored in the file server 115 with data stored in the database 119 to generate a document for printing or another purpose. This operation is requested through the user interface 103.

3. Description of Layout Editing Application

Layout Editing Processing

Of the layout editing application 121, layout editing processing implemented through the user interface 103 will be described below in detail.

3-1 Main Window

Figure 3:
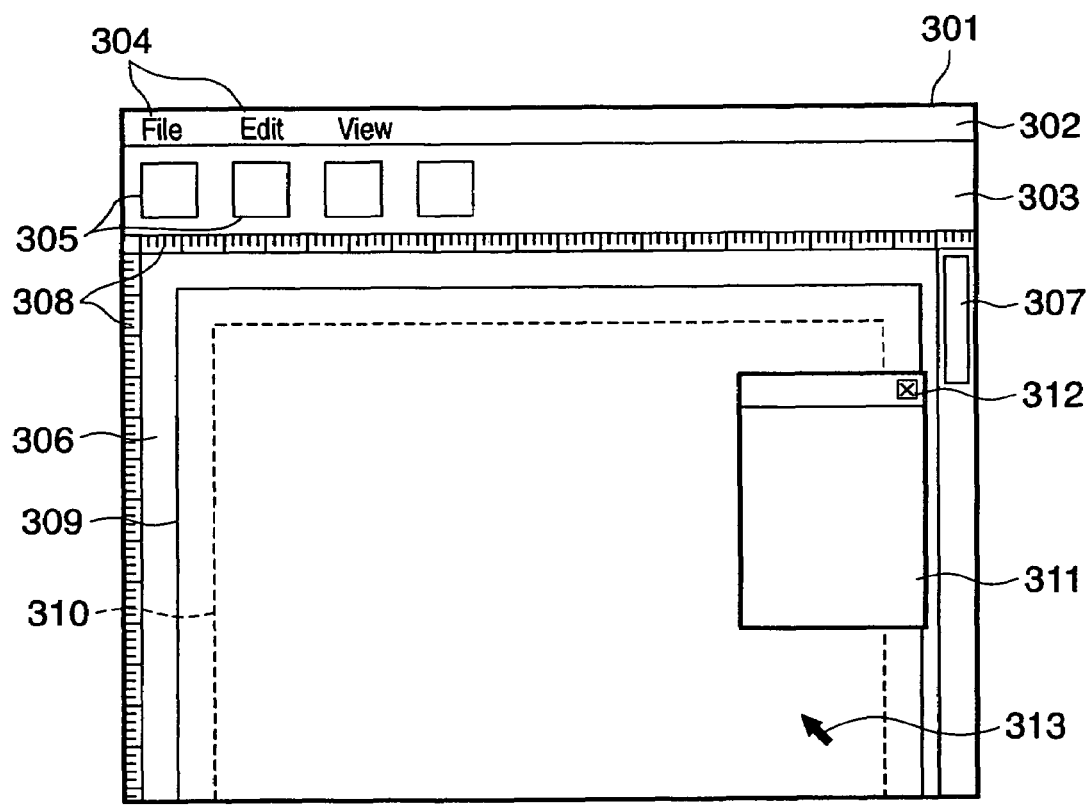
FIG. 3 is a view showing the main window of a layout editing application program.

At the time of operation, the user interface 103 causes the video display 144 to display a user interface window formed by an application window 301 shown in FIG. 3. The window 301 has a menu bar 302, tool bar 303, work area 306, and optional palette 311. The menu bar 302 and tool bar 303 can be set in a non-display state or moved to various positions on the screen. The position of the work area 306 can be moved by operating the mouse 133. The palette 311 is an option. A cursor/pointer device 313 represents a position indicated by the mouse 133.

The menu bar 302 as a known technique has a number of menu items 304 extended under the layer of menu options.

The tool bar 303 and tool buttons 305 are widgets which can be set in a non-display state or display state by a special mode of the application.

A ruler 308 is an option and is used to indicate the position of a pointer, page, line, margin guide, or container in the work area.

The palette 311 has a window control 312 to move, resize, or close it. The palette 311 can optionally be displayed on the foreground of the work area or hidden behind a container. The palette 311 can be displayed only within the application window 301 or can partially or wholly be displayed outside the application window 301.

Figure 4:
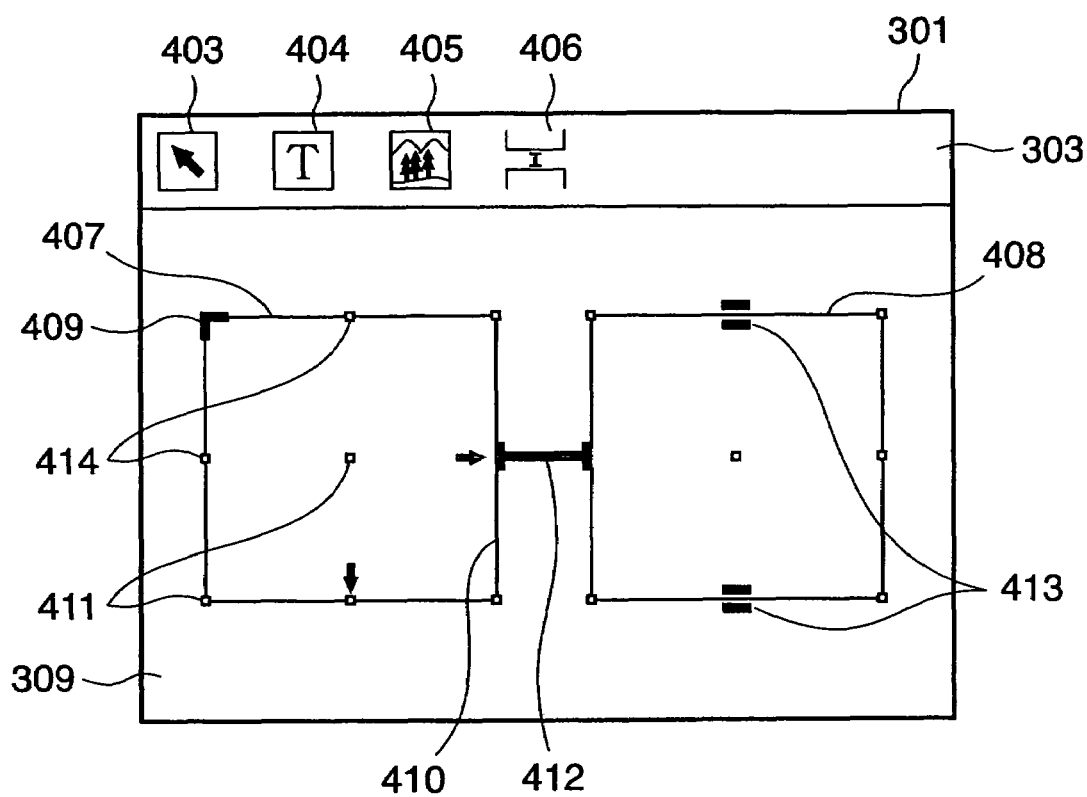
FIG. 4 is a view showing the main window of the layout editing application program.

User-selectable "tool buttons" as shown in FIG. 4 are laid out on the tool bar 303.

(1) Select tool button 403: This button is used for side selection, movement, size change, resize, or lock/unlock of a container. A container is selected by dragging a select box around the container. When a plurality of containers are selected while keeping the CTRL key pressed, the plurality of containers can be selected.

(2) Text container tool button 404: This button is used to create a container having a static or flexible text.

(3) Image container tool button 405: This button is used to create a container having a static or flexible image.

(4) Link tool button 406: This button is used to create a link to associate containers with each other. This button is also used to control the distance of the link.

3-2 Document Template

Referring to FIG. 3, the work area 306 is used to display and edit the design of a document template. Hence, the user can design the outline of a document to printed by preprocessing.

The work area 306 comprises a scroll bar 307, the optional ruler 308, and a document template 309. The document template 309 can indicate the presence of a plurality of pages.

The page size of a given document template is designated by the user. The actual number of pages of each document can change depending on the amount of inserted data. If data cannot be fitted in one page, an additional page is automatically created.

A border 310 in each page is an arbitrary page margin representing the maximum width of a container printable on the page.

FIG. 4 shows examples of containers which can be displayed on the document template 309 of one page. They include a plurality of containers 407 and 408, an arbitrarily applied anchor icon 409, a link 412, and sliders 413.

3-3 Container

A container will be described. A container is a rectangular partial area (data area) where fixed or flexible contents data (text or image) is inserted from a data file to the document template and drawn. A container is laid out in the document template 309 together with other containers, as shown in FIG. 4. Movement, size adjustment, and re-creation of the container are done by operating the mouse 133 on the basis of an operation instruction from the user through the user interface window. The definition of a container according to this embodiment will be described below.

(1) A container (data area) is associated with a fixed or flexible content. A flexible content can be regarded as dynamic because data acquired from the data source can change for each document, i.e., each record. In this embodiment, however, animated contents and contents which change over time by another method are not assumed. A fixed content is displayed in a similar manner in all documents generated by using containers (data areas). However, when a link is set between a fixed content and a flexible content, the fixed content may be influenced by the flexible content and change its layout position in each document.

(2) A container (data area) has ornament functions like text settings such as a background color, border, and font style applied to a content. This setting is called a container attribute. The container attribute can be set for each container. The setting can also be done such that a container has the same container attribute as another container (data area).

(3) A container (data area) is merged with data from the data source in generating a document. The ornament function can visually be recognized on a printed output product for all fixed contents. A flexible content provides display of specific data from the data source. This expression of the container (data area) can be, e.g., printed or displayed on the screen of the video display 144, or subjected to both printing and display.

(4) A container (data area) has a user interface as a visual key, as shown in FIG. 4. A container (data area) has, e.g., an interactive graphical user interface (GUI) to edit the container or set display. Each element of the GUI is displayed on the screen of the video display 144 but not printed in the document. The user interface 103 of the layout editing application 121 has a function of displaying some of the ornament functions of a container (data area) such as the background color and font and allowing editing and display of settings of the container (data area).

3-4 Constraints of Container

Each container has constraints about control conditions for the manner contents displayed by the respective documents are combined. These constraints (including combining a fixed or flexible content with a container) are used as a principal method of causing the user to control a number of documents from one document template. An example of the constraint is "the maximum height of the content of this container is 4 inches". Another example of the constraint is "the left edge of the content of the container must be displayed at the same horizontal position in each document". The contents described here indicate various methods of displaying and editing such constraints by using the GUI.

A contents place holder which designates the layout of a fixed content like an image having a defined place on a page is well-known in the digital print technique. Each container has a position and size. The containers are edited and displayed by a method as a known technique. The following description will be made with a focus on display and editing in a method specialized to flexible data print.

When containers are used, the user can designate the sizes (drawing sizes) and positions of contents in a document. Since many kinds of documents are generated from one document template, a number of possibilities and constraints are set for the containers. To set (designate) and display them, a predetermined user interface is used.

The sides of one container define the virtual border of an associated content displayed in the document. Hence, discussion about the left side of a container is equivalent to discussion about the leftmost side of an area where an associated content can be displayed in each document. Similarly, discussion about the height of a container can be understood as discussion about the constraint of the height of an associated content in the generated document. In this specification, they are clearly distinguished in discussing the side or size of a container by referring to the user interface 103.

In the following description, the term "fixed", which defines a certain value used to restrict display of a content, applies to all documents in the same way.

(1) When the width of a container is fixed, the width to be assigned to an associated content is the same in all documents.

(2) When the height of a container is fixed, the height to be assigned to an associated content is the same in all documents.

(3) When a distance (link length) is fixed, the designated distance is a constraint in all documents.

(4) When the left and right sides of a container are fixed, the horizontal positions of sides related to the page are the same in all documents. However, the height or vertical position of the container can change. For example, when the left side of a container is fixed, the left side of an associated content is displayed at the same horizontal position in all documents. However, the content may be displayed on the upper side of the page in a document and on the lower side of the page in another document.

(5) When the upper and lower sides of a container are fixed, the vertical positions of sides in the page are the same in all documents. However, the width or horizontal position of the container can change for each document.

(6) The vertical axis of a container is a virtual vertical line which is parallel to the right and left sides of the container and is located at the intermediate position therebetween. When the vertical axis of the container is fixed, the average of the horizontal positions of the left and right sides of the container (i.e., the central position between the left and right sides) is the same in all documents. In this constraint, the width of the container can change. However, the vertical axis is located at the same horizontal position in all of documents independently of whether the left and right sides are nearest to or farthest from the vertical axis. Note that the height and vertical position of the container are not influenced by this constraint.

(7) Similarly, when the horizontal axis is fixed, the average of the upper and lower sides of a container is located at the same vertical position. However, the width and horizontal position of the container are not influenced by this constraint.

(8) When both the horizontal axis and the vertical axis are fixed, the central position of the container is fixed. However, the width and height of the container are not influenced by this constraint.

(9) When the angular position of a container, the intermediate position of a side of a container, or the central position of a container is fixed, the position is the same in all documents. For example, when the upper left corner of a container is fixed, the upper left position of the container laid out is the same in all documents.

(10) The vertical sides or vertical axis can be fixed in association with the left or right side of the page, left or right page margin, or another horizontal position. Similarly, the horizontal sides or horizontal axis can be fixed in association with the upper or lower side of the page, upper or lower page margin, or another vertical position.

A term opposite to "fixed" is "flexible" which indicates that a side, axis, corner, or intermediate position of a container or a document constraint can change between documents (between records). For example, in a page, the layout is expected to dynamically change depending on the size or amount of flexible data (contents data). However, the user may want that the size or position of a specific container is fixed, or the four corners of a container at a corner of the page is fixed. For this purpose, the layout editing application 121 can appropriately set, for each container (partial area), whether to fix or change a side, axis, corner, or intermediate position. Hence, the user can create a desired basic layout in determining the basic layout of the document template 309.

3-5 Method of Creating New Container

As shown in FIG. 4, a new text container or image container is created on the document template 309 by clicking the mouse 133 on the text container tool button 404 or image container tool button 405 and dragging a rectangle on the document template 309. The size of a new container created on a document is defined as the standard size of a container.

Alternatively, a container may be created by activating the appropriate tool button 404 or 405 and simply clicking the mouse on the document template 309. In this case, a container having a default size is inserted in the document template 309 in accordance with the click operation of the mouse 133. In addition, a dialogue box or prompt to set the size of the new container is provided. The container size can be set by various methods. For example, the size may be defined automatically in advance, or a container may be created and laid out by a calculated schema. When the generated container is selected by an input device such as the mouse 133, and its properties are displayed by clicking on the right button of the mouse, the container property dialogue is displayed so that constraints for the container can be set. In the container property dialogue UI, various kinds of constraints described above can be set. In the container property dialogue, the size (width and height) and position of the container can be set. To set a flexible size, the basic pattern (standard size and standard position) of the container is set. In addition, the maximum container size (width and height) and the minimum container size (width and height) can be set. When a flexible size is set for a container, the container size can be changed from the preset standard size in accordance with the size of contents data inserted in the container. When a container with a flexible size is used, the problem of overflow or space formation can be solved.

3-6 Container Display Method

FIGS. 5A to 5D show display rules about the sides of a container.

To express the state of a side of a container, the layout editing application program 121 expresses a side by using a solid line (item 503) or a dotted line (504). In addition, the application 121 uses anchors (line, shape, and icon indicated by 506, 507, and 509 drawn near the sides), handles (control points 502 drawn on or near the sides of the area for movement and correction), sliders (short parallel lines drawn on both sides of a side, 403 in FIG. 4), enlarge/reduce icons (505), and colors.

The rules of the container display method shown in FIGS. 5A to 5D are as follows.

(1) To fix a side, it is drawn by a solid line.

(2) When the width is fixed, the left and right sides are drawn by solid lines.

(3) When the height is fixed, the upper and lower sides are drawn by solid lines.

(4) The axes are not drawn.

(5) Enlarge/reduce icons are drawn near each of sides which are not drawn according to the rules (1) to (3). The sides are drawn by dotted lines.

(6) When the pair of vertical and horizontal sides or the pair of vertical axis and horizontal axis are fixed, an anchor is drawn at the intersection between them.

(7) When no anchor is drawn anywhere on a fixed side, a slider is drawn at the center of the edge.

(8) When neither anchor nor slider is drawn for the pair of vertical and horizontal sides or the pair of vertical axis and horizontal axis, a handle is drawn at the intersection between them.

The lines defined by the rules (1), (2), and (3) are fixed or restricted, as described above, and drawn by solid lines. Flexible sides defined by the rule (5) are drawn by dotted lines. Fixed points defined by the rules (6), (7), and (8) represent anchors. Some fixed sides represent sliders. Remaining points represent handles.

In the above-described rules, higher priority is given to a constraint set by the user later. That is, when another constraint is set later, and it can influence sides which should be drawn in accordance with the above-described rules, the drawing contents of solid line or dotted lines are changed.

The location where a flexible side is drawn depends on the content of the container. As will be described later, "dynamic calibration processing" is used, which indicates that a content is merged with a document template and made visible by the user interface. Alternative execution can be used by another means for determining the layout position of a flexible side in the user interface or the content area of the container averaged in all documents.

These content expressions provide a graphical means for displaying the state of each side of a container. The expressions can be interpreted in the following way.

(1) A dotted line indicates that the position of the side in the document changes depending on the content of the container, like the side 410 shown in FIG. 4.

(2) A solid line indicates that the side is restricted because it is fixed (side 414), or the width or height of the container is fixed (in the container 408, the four sides are indicated by solid lines so that both the width and height are fixed).

(3) An anchor indicates that the point where sides or axes cross is fixed. Hence, the anchor point appears at the horizontal and vertical-positions in all documents. The anchor is fixed, as a matter of course. The icon 409 in FIG. 4 is an example of an anchor icon which indicates that the position at which the sides 414 cross is fixed.

(4) A slider indicates that the associated side can be translated although it has a fixed length. For example, the sliders 413 in FIG. 4 indicate the content of the container 408 may be displayed on the left or right side of a position represented by a specific diagram in the document. For example, when the image size or text amount of data inserted in the container 407 associated with the container 408 (a link is set between the containers) is small, the size of the container 407 becomes small. For this reason, the container 408 is slid (translated) to the left and laid out. When the size of the container 407 becomes large, the container 408 is slid conversely to the right and laid out.

Some or all of these icons and sides are drawn or not drawn depending on which tool or which container is selected/highlighted or activated. Generally, the container sides and icons are not drawn on a printed product because they are assistant tools for designing the document template.

As described above, settings for the basic pattern including the basic values, minimum values, and maximum values of the width and height of a container are displayed in a secondary dialogue window.

Figure 5A:
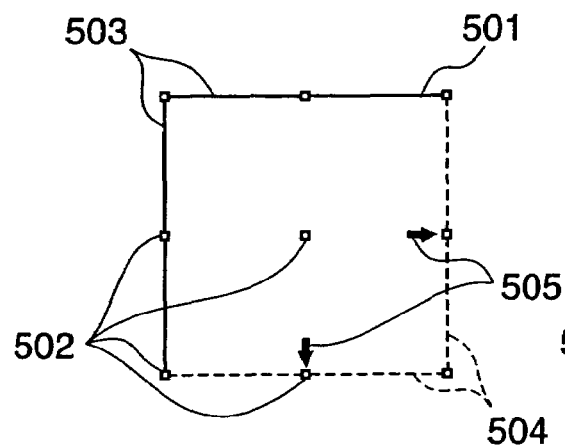
FIGS. 5A to 5D are views for explaining container display rules.

Referring to FIG. 5A, in a container 501, neither the width nor height is fixed (flexible). The fixed sides 503 are expressed by solid lines. The flexible sides 504 are expressed by dotted lines. The enlarge/reduce icons 505 represent the adjacent sides 504 are flexible. An indicator in another form may be used instead or additionally.

Figure 5B:
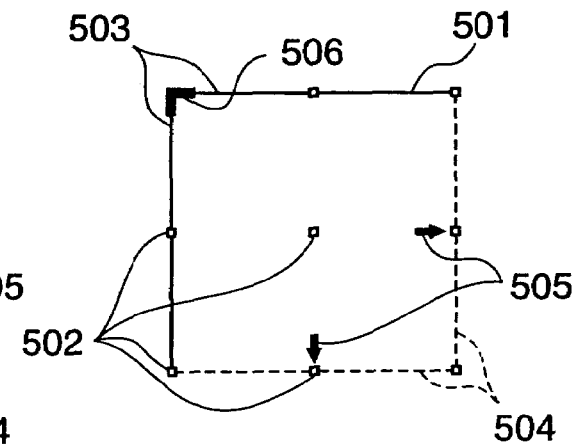

Referring to FIG. 5B, in the container 501, both the width and height are flexible. The anchor icon 506 is added to explicitly represent that the position of the corner at which the sides 503 cross is fixed.

Figure 5C:
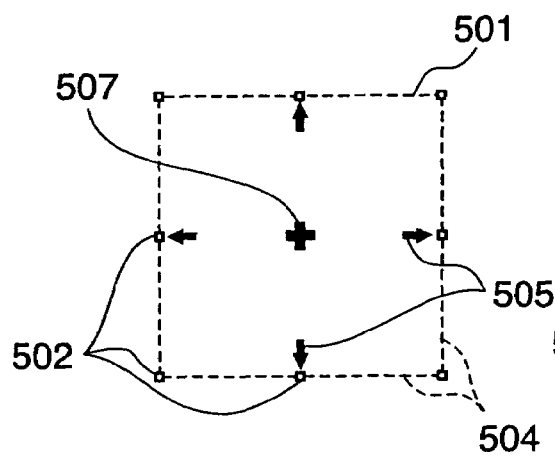

Referring to FIG. 5C, in the container 501, both the width and height are flexible. In this state, the container can extend equally from the central point indicated by the arbitrary anchor icon 507. That is, the container 501 can be enlarged or reduced about the anchor icon 507. In enlargement/reduction, the layout is adjusted such that the anchor icon 507 is always located at the central point of the container 501.

Figure 5D:
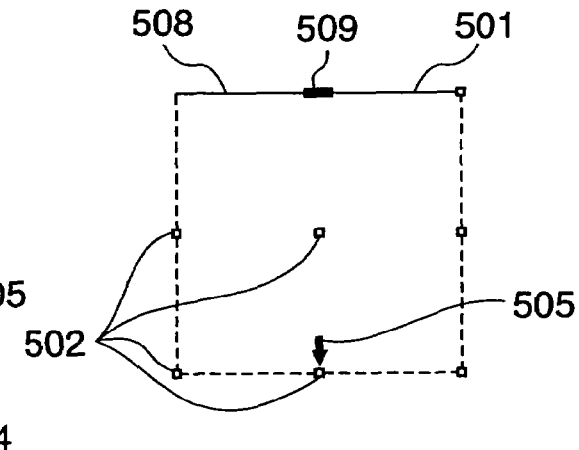

Referring to FIG. 5D, although an upper side 508 of the container 501 is fixed, both the width and height are flexible. The anchor icon 509 located at the center of the upper side 508 is fixed. The left and right sides (502) of the container 501 enlarge or reduce the container about the central axis (vertical axis) extending perpendicularly through the anchor icon 509.

3-7 Link

A link indicates the association between a container and another container. The association indicates the distance between the containers. The layout of containers associated by a link is calculated in consideration of the influence of their layout change. Reference numeral 412 in FIG. 4 denotes a link which associates the containers 407 and 408 in FIG. 4.

3-8 Link Setting Method

A method of setting of a link to associate containers with each other will be described next. FIG. 6 is a flowchart showing the link setting method. FIGS. 7A to 7C show an example a UI in setting a link. The method of setting a link between containers will be described with reference to FIGS. 6 and 7A to 7C.

To set a link, containers (at least two containers) to set a link are created (step S601). FIG. 7A shows two created containers (701 and 702). Reference numerals 703 and 704 denote anchors; and 705, a mouse pointer.

In step S602, the link tool button 406 is selected. In step S603, one container (container 701) to set to a link is selected by clicking on it by the mouse pointer 705.

In step S604, the container 702 to set a link to the container 701 selected in step S603 is selected. More specifically, the mouse pointer 705 is moved to click on the container 702. FIG. 7B shows a state after clicking on the container 701 until clicking on the container 702. As shown in FIG. 7B, a line segment 706 which connects the click point in step S603 and the current position of the mouse pointer 705 is displayed.

When the container 702 is selected in step S604, a link between the container 702 and the container 701 is displayed in step S605. FIG. 7C shows a state wherein a link 707 is displayed by clicking on the container 702.

When the link is set, the UI of the containers is also automatically changed in step S606 (sides 708 are automatically changed to dotted lines which indicate flexible sides, as described above). The state of the sides of the containers changes, as shown in FIG. 7C, because the containers must have flexible sides due to link setting. This processing is automatically executed aiming at preventing any contradiction which may occur when all sides are fixed even after link setting. Marks 709 visually show the user the directions in which the containers can change due to link setting, like the icons 505 shown in FIGS. 5A to 5D. In the example shown in FIG. 7C, the right side of the left container and the left side of the right container change to flexible sides. This is merely an example. The right container may change to setting with the sliders 413 in FIG. 4.

3-9 Setting of Link with Flexible Length

Figure 12:
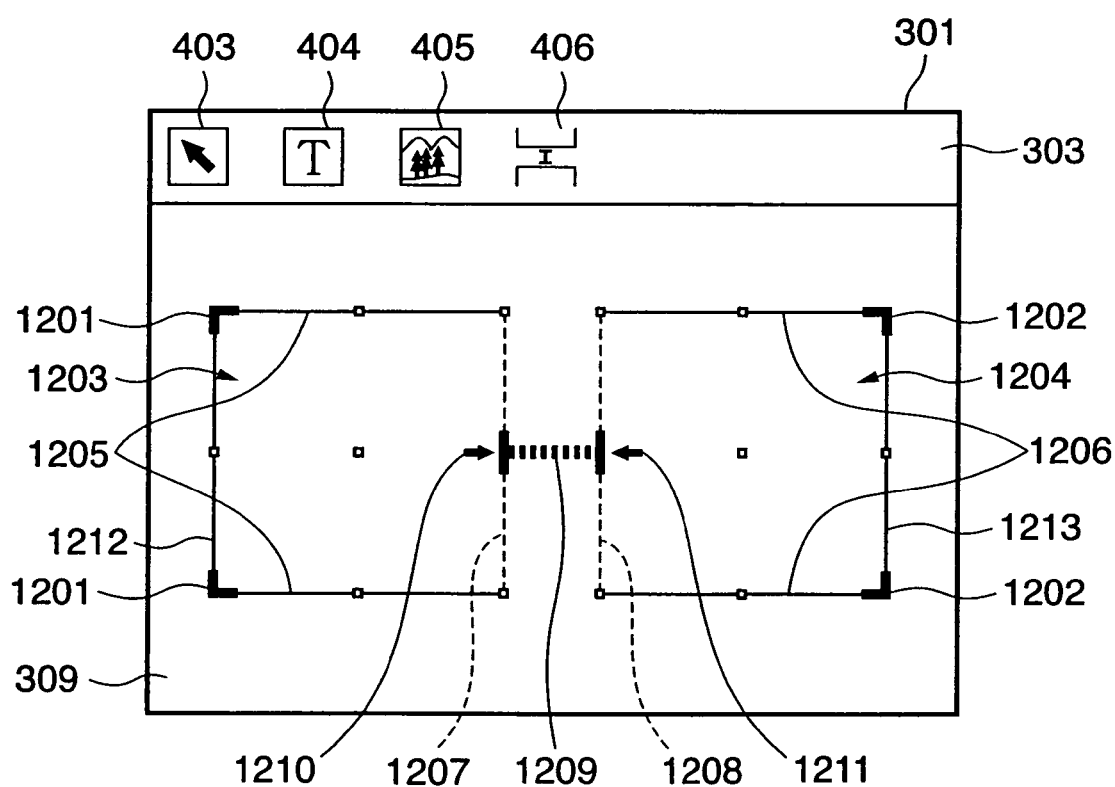
FIG. 12 is a view showing container layout by flexible link tools.
Figure 13:
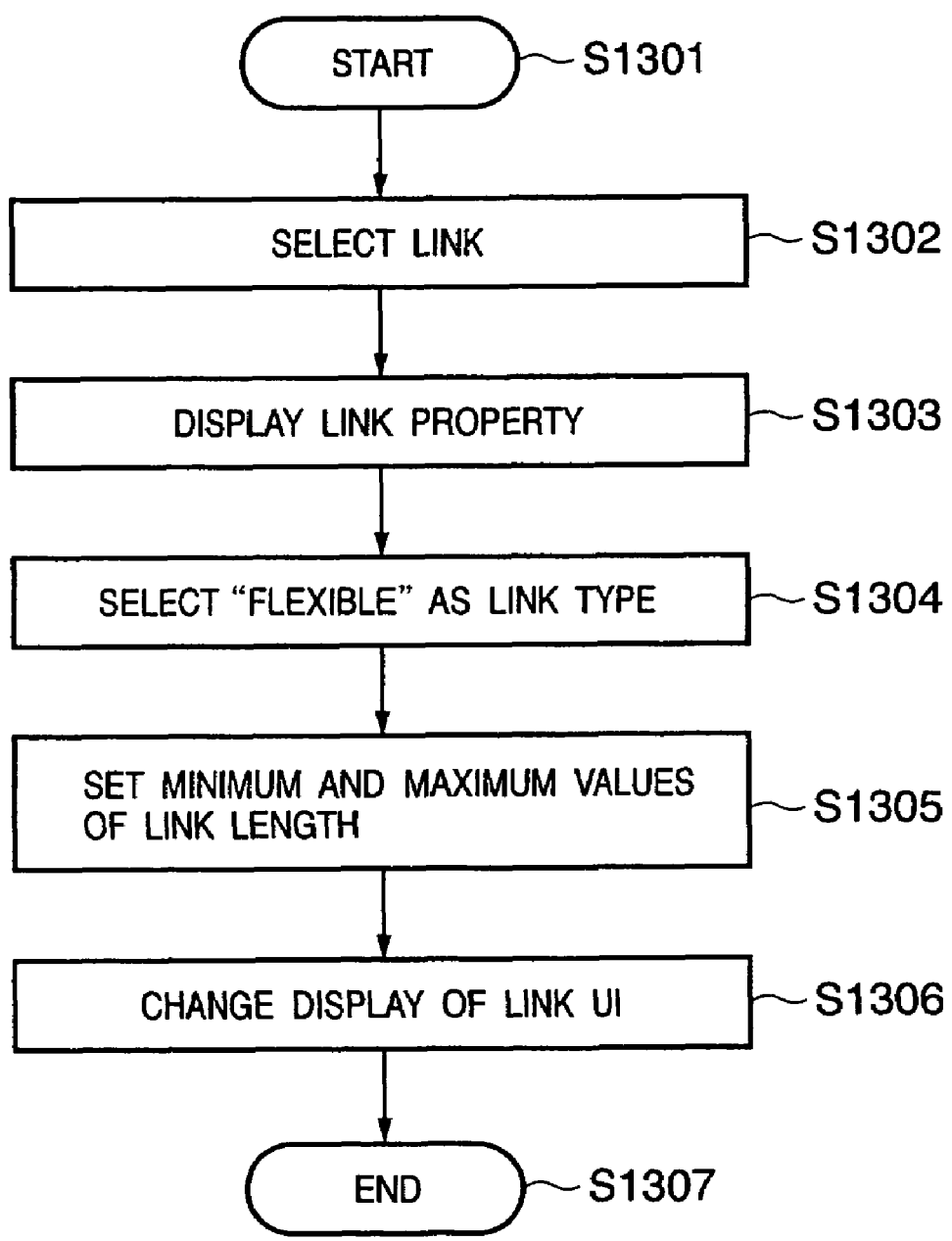
FIG. 13 is a flowchart showing the flow of link setting processing.

FIG. 12 shows a UI to set a flexible link. In the state shown in FIG. 12, containers 1203 and 1204 are present on the document template 309. The containers include anchor icons 1201 and 1202 and fixed sides 1205 and 1206. A link 1209 having a flexible size is set between the containers 1203 and 1204 to connect them. Since the link is set between the containers 1203 and 1204, a right side 1207 of the container 1203 and a left side 1208 of the container 1204 are expressed by dotted lines. Hence, indicators 1210 and 1211 are displayed in the containers to indicate that the sides 1207 and 1208 are flexible.

Figure 14:
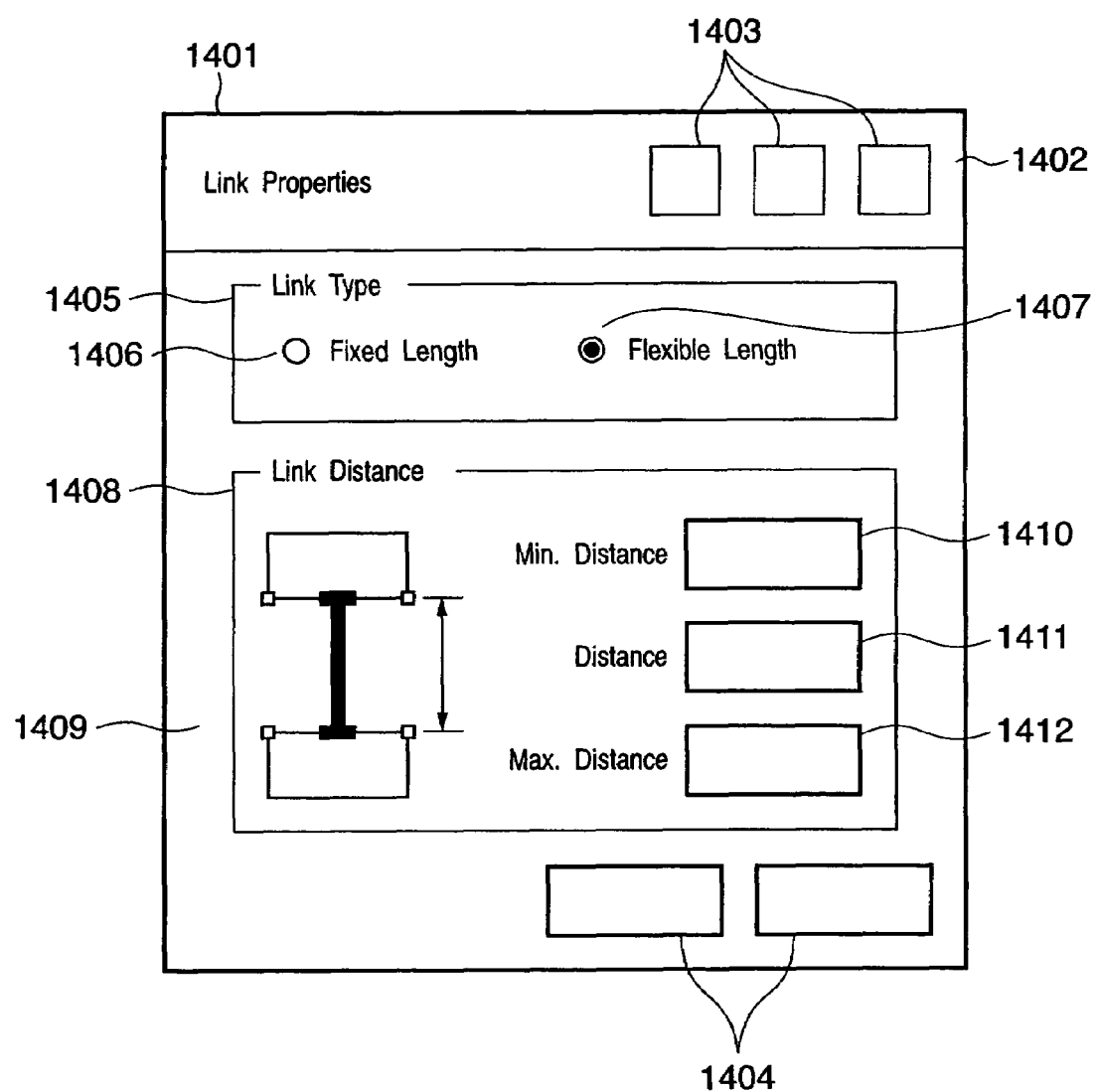
FIG. 14 is a view showing a link setting dialogue window.

FIG. 14 shows a UI window in the link setting means. FIG. 14 shows an example of a dialogue window 1401 to set the information of the link 1209. This dialogue includes a title bar 1402, a tool button 1403, a button 1404 to open/close the dialogue window, and an area 1409 to set various kinds of information. In this dialogue window, the link type can alternatively be selected from a flexible length (1407) and a fixed length (1406). When the link type is "flexible", the minimum value (Min. Distance 1410), maximum value (Max. Distance 1412), and standard value (Distance 1411) of the link length can be set. The setting is displayed when a link is set between two containers, and the set link is selected by, e.g., a click operation. Alternatively, immediately after a link is set, the dialogue window 1401 related to the link may be displayed automatically. The standard value 1411 of the distance between the containers indicates a link length used when the size of each container does not change at the time of data insertion.

Figure 15:
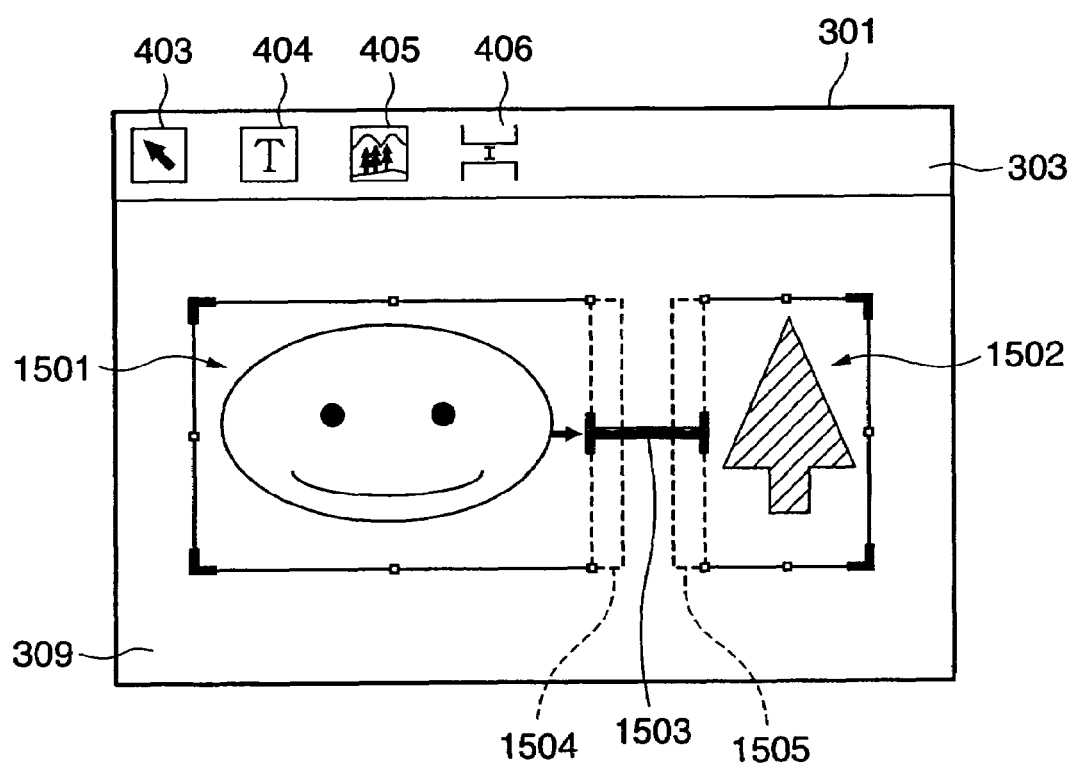
FIG. 15 is a view showing an example of an automatic layout processing result by a fixed link.

FIG. 15 shows a layout result when a link with a fixed size is used. Layout calculation is executed in the above-described way. For example, assume that image data having different sizes are inserted in the containers 1203 and 1204 shown in FIG. 12. In this case, each container regards the sizes of inserted contents data as optimum. The container 1203 changes its size rightward to a frame 1504 (optimum container size) corresponding to the image size of the inserted image data. Similarly, the container 1204 changes its size leftward to a frame 1505 (optimum container size) corresponding to the image size of the inserted image data. However, the left side 1212 of the container 1203 and the right side 1213 of the container 1204 cannot be moved because of the anchors 1201 and 1202. To change the sizes of the containers, the distance between them must be shortened. However, a link 1503 having a fixed size is set between the containers. Since the link length is maintained in the layout calculation, the sizes of the containers 1203 and 1204 are changed.

As a consequence, the containers 1203 and 1204 cannot ensure the optimum sizes corresponding to the horizontal to vertical ratios of the data. Finally, as shown in FIG. 15, the container sizes are smaller than the optimum sizes (frames 1504 and 1505). That is, since the size of the link 1503 is fixed, the containers 1203 and 1204 cannot achieve the optimum sizes (referring to FIG. 15, the range indicated by the thin dotted line in each container represents the horizontal to vertical ratio of the data).

Figure 16:
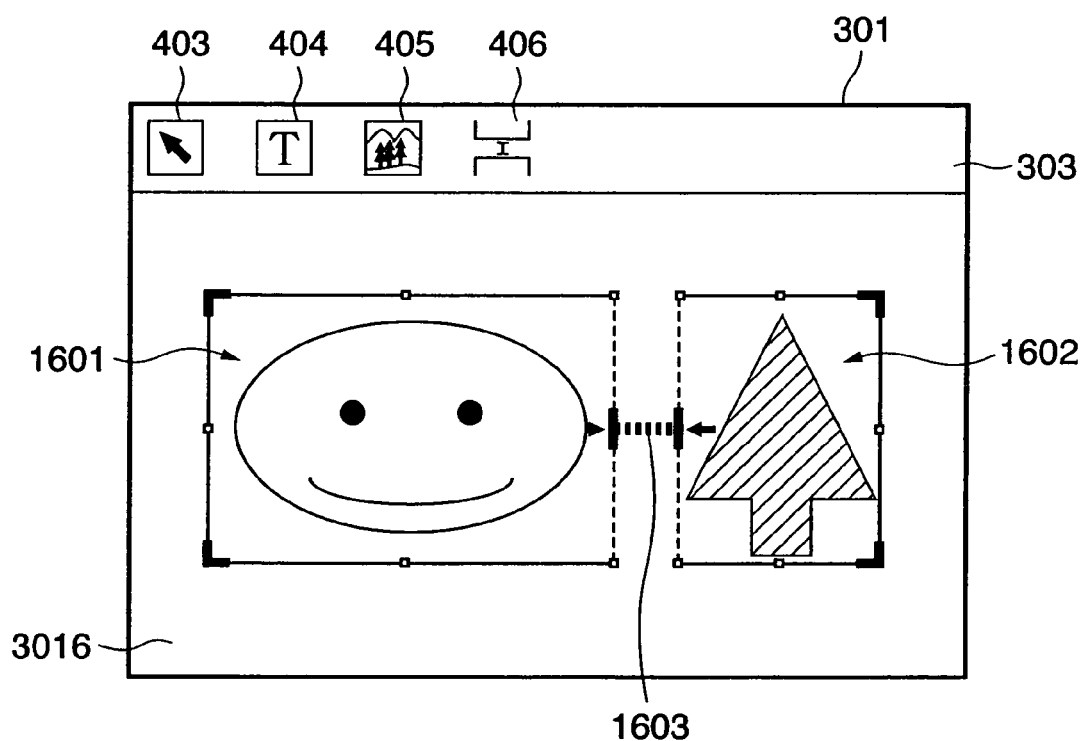
FIG. 16 is a view showing an example of an automatic layout processing result by a flexible link.

FIG. 16 shows the same case as in FIG. 15 except that the link has a flexible size. In this case, a link having a flexible size is set between the containers 1203 and 1204 of the above example, as shown in FIG. 16. Hence, when the sizes of the containers 1203 and 1204 are changed, the link size decreases so that the containers 1203 and 1204 can be larger than in the example shown in FIG. 15. As a result, optimum sizes corresponding to the data sizes of inserted data can be achieved. Alternatively, container frames close to the data sizes (optimum sizes) of inserted data can be set. FIG. 16 shows this result. The size of the flexible link 1209 changes to a size indicated by a flexible link 1603 as a result of layout calculation. In this case, the containers 1203 and 1204 have optimum sizes (sizes corresponding to the data sizes).

4. Description of Layout Editing Application

Automatic Layout Processing

Automatic layout processing executed by the layout editing application 121 will be described below in detail.

4-1 Layout Calculation Method (Overall Flow)

As described above, processing by the layout editing application 121 of this embodiment is classified into layout editing processing of creating containers by using the user interface 103 and executing association (link setting) between the containers and automatic layout processing of causing the layout engine 105 to insert data from the data source to the created layout. The automatic layout processing includes a preview mode in which actual data are inserted, and layout calculation on display is executed in accordance with the above-described priority order, and a print mode in which the result obtained by layout calculation is actually printed. The layout calculation in the preview mode and that in the print mode are the same.

Figure 8:
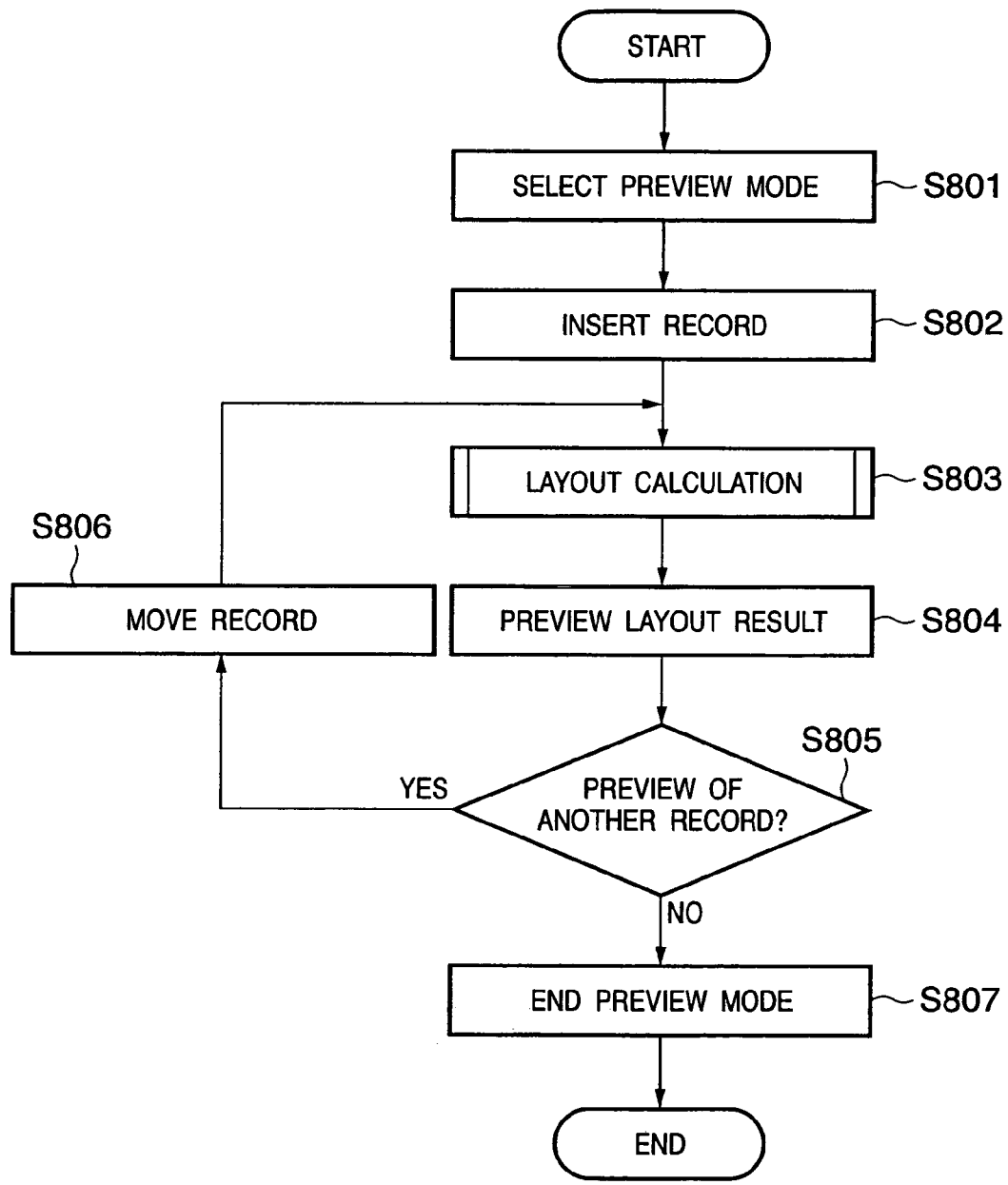
FIG. 8 is a flowchart showing automatic layout processing by a layout engine.

FIG. 8 shows the flow of layout calculation by the layout engine 105. First, the preview mode is selected (step S801). In the preview mode, the layout editing application 121 causes the user to select a record to be previewed from the data source and determines to insert each data of the selected record in each container (step S802). When insertion of the data in each container is determined, the layout editing application 121 executes calculation to lay out the record and executes layout adjustment as needed (step S803). The layout calculation in step S803 will be described later in detail. The layout editing application 121 displays the layout calculated in step S803 (step S804). The layout editing application 121 determines in accordance with a user instruction whether to preview another record (step S805). If NO in step S805, the preview mode is ended (step S807). If YES in step S805, the layout editing application 121 selects another record, executes layout calculation again, and previews the layout (step S806).

When not the preview mode but the print mode is set, layout calculation is done sequentially for all records to be printed. Hence, step S804 is omitted. In step S805, it is determined whether all records to be printed are processed. The layout calculation result in step S803 is output, and print data is generated by using the printer driver and output to the printer. In this case, when print data output is ended for all records (all records designated for printing), the processing is ended.

4-2 Layout Calculation Method (Details)

Figure 9:
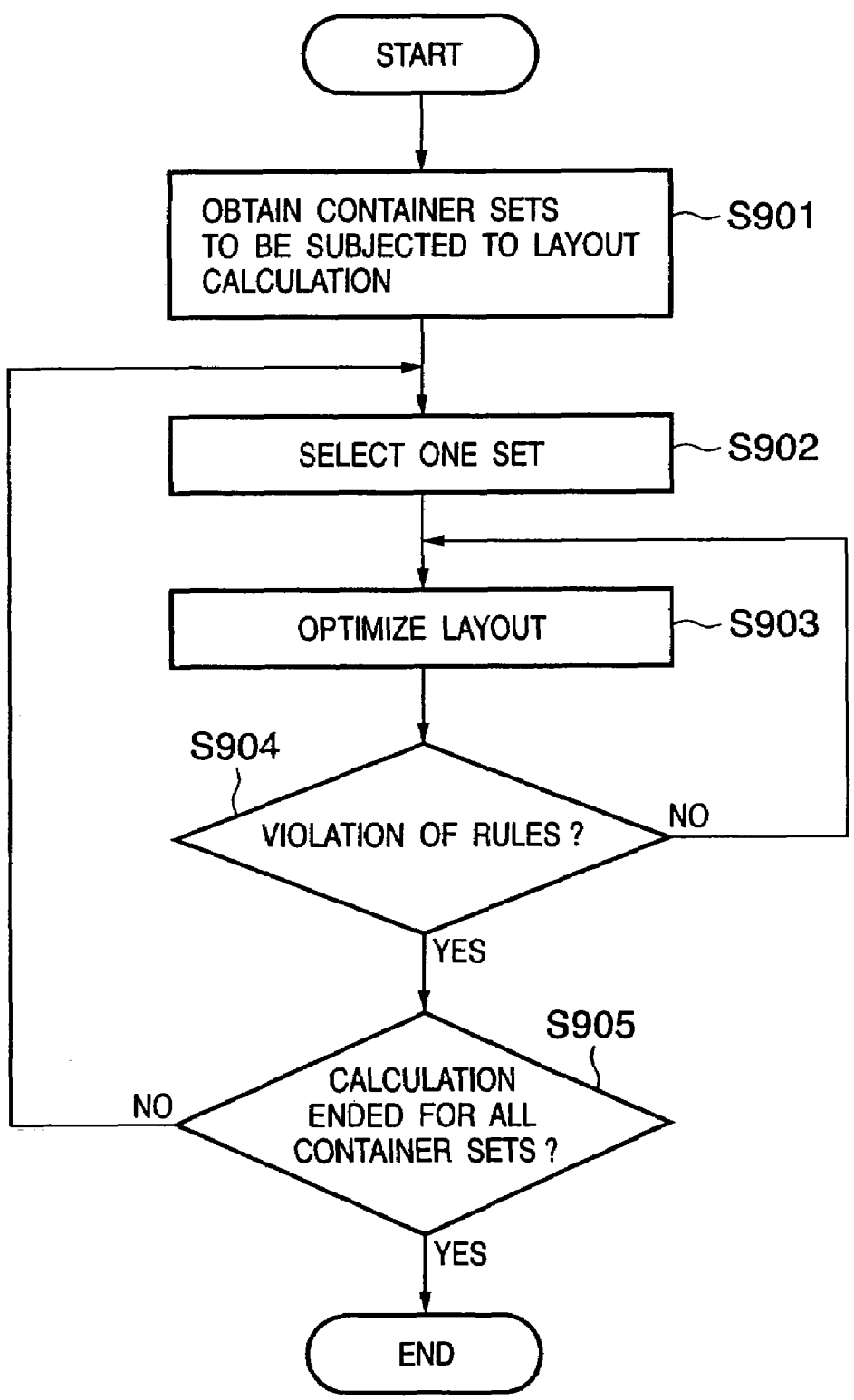
FIG. 9 is a flowchart showing automatic layout processing by the layout engine.
Figure 10A:
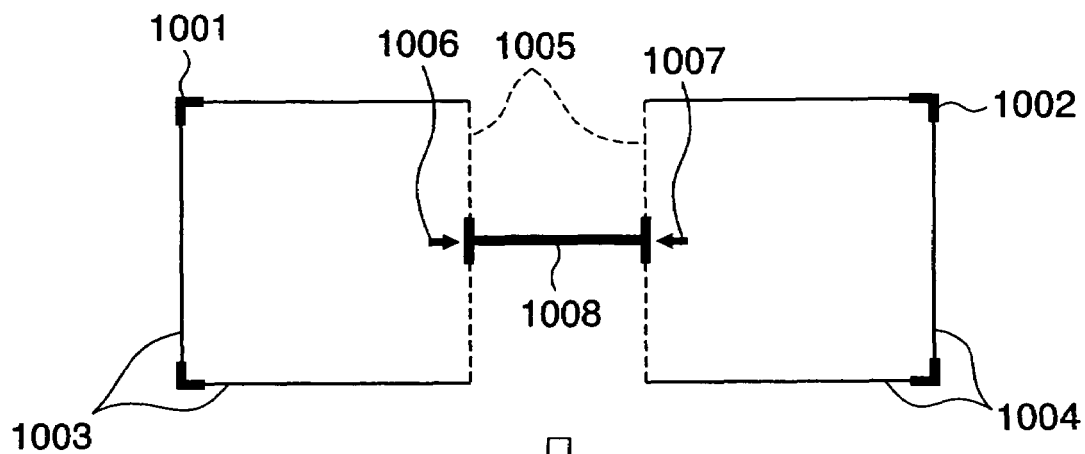
FIGS. 10A to 10C are views for explaining automatic layout processing.
Figure 10B:
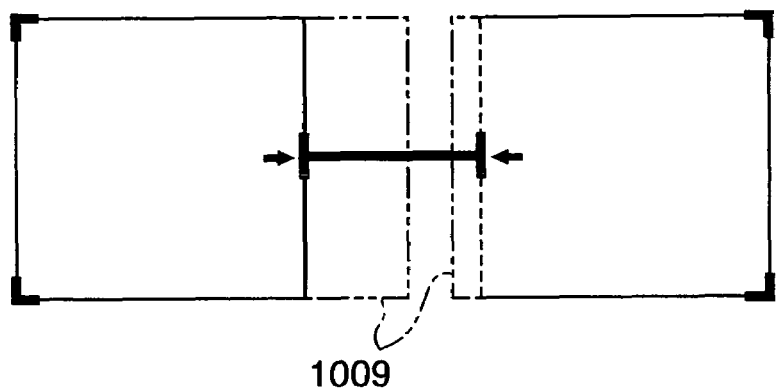
Figure 10C:
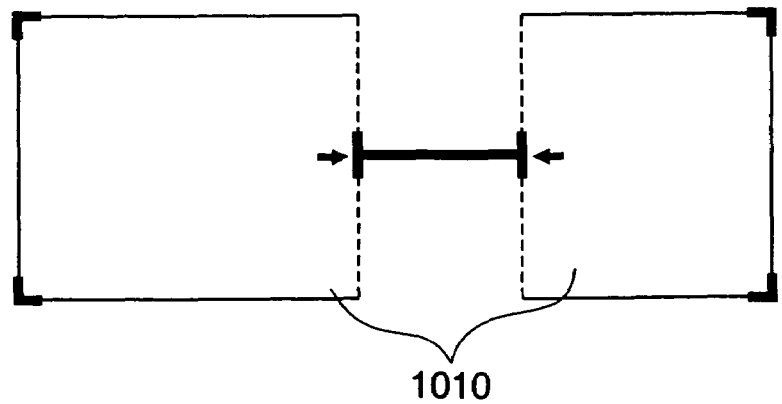

The layout calculation in step S803 will be described next in detail. FIG. 9 is a flowchart showing a layout calculation method when the layout priority order of this embodiment is not set. FIGS. 10A to 10C are views showing an example of the UI display at this time. FIG. 9 is a flowchart for explaining only the layout calculation processing method. This corresponds to the layout calculation method in the print/preview mode of one record. When a plurality of records are present, the following processing is repeated.

Figure 11:
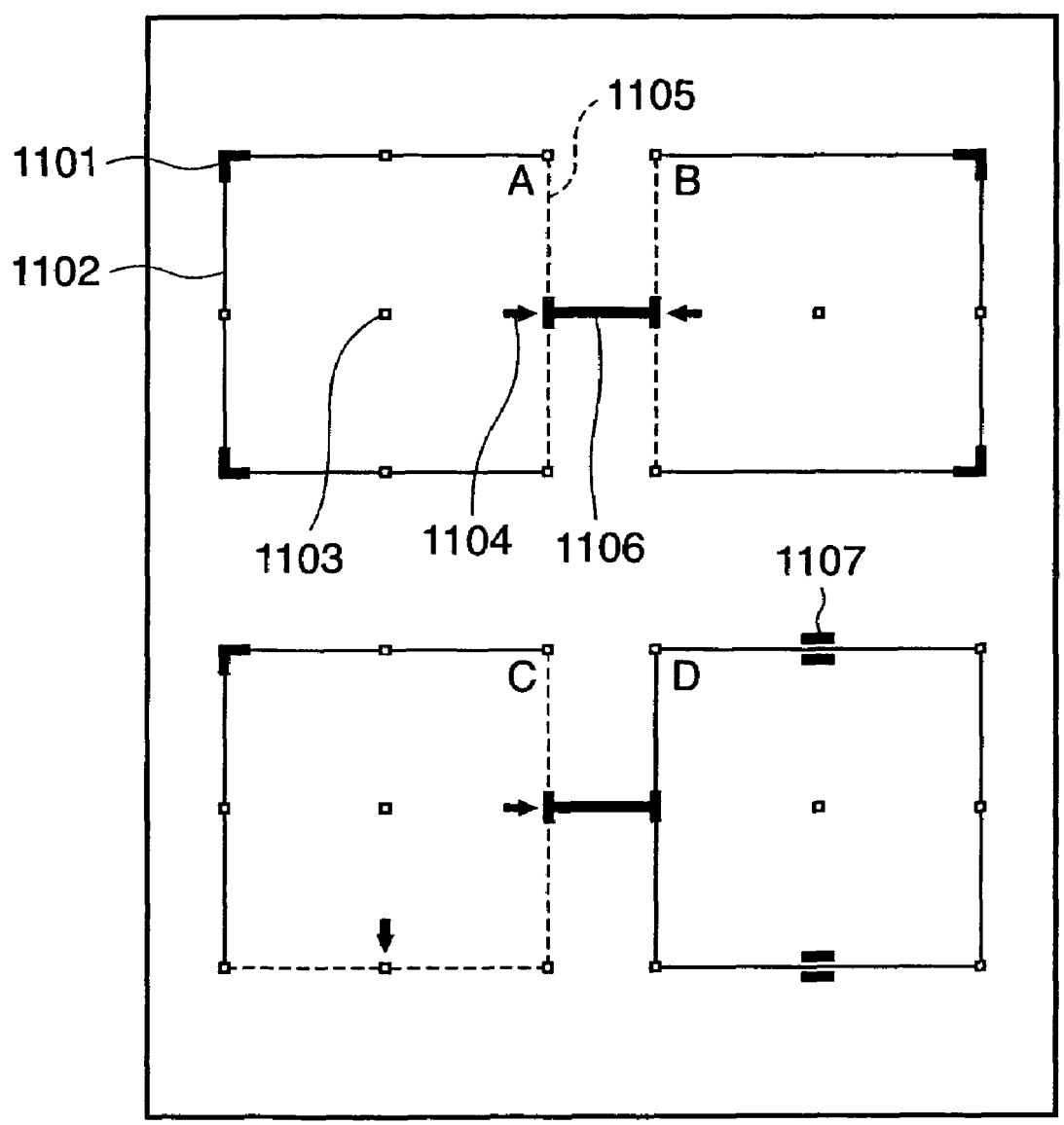
FIG. 11 is a view for explaining a set of containers in automatic layout processing.

First, the layout editing application 121 obtains a set of containers whose layout should be calculated (step S901). Layout calculation is executed for a set of containers with link setting. Referring to, e.g., FIG. 11, four containers are laid out on a page, and links are set between them. In this case, a link is set between containers A and B, and another link is set between containers C and D. Hence, the containers A and B form set 1, and containers C and D form set 2. That is, a group of containers connected by a link is specified as a set. As described above, reference numeral 1101 denotes an anchor; 1102, a fixed side; 1103, a controller; 1104, an arrow which indicates the change direction of a flexible side; 1105, a flexible side; 1106, a link; and 1107, a slider.

The layout editing application 121 selects a set as a layout calculation target from the container sets obtained in step S901 (step S902). For the selected container set, layout calculation is executed. First, the sizes of the two containers (A and B) as flexible elements included in the selected container set are calculated assuming that the containers are not influenced by the image size or text amount of data to be inserted. More specifically, the layout editing application 121 determines whether the container A is an image data container or text data container. This determination can be done on the basis of the attribute set for the container, as described above.

Next, the layout editing application 121 reads out the data to be inserted in the container A. When the container A is an image data container, the size (the number of horizontal pixels, the number of vertical pixels, and the resolution) of the image data is defined as the size of the container A without any constraint. When the container A is a text data container, the amount of data to be inserted in the container A can be calculated on the basis of the number of characters of text data and the character attribute such as a font type, font size, character pitch, and line pitch designated by the container attribute of the container A. For the text data container, a constraint is applied because the horizontal to vertical ratio of the container A cannot be determined without considering a constraint. In the example shown in FIG. 11, since anchors are set at the upper left and lower left corners of the container A, the height (vertical direction) is fixed. Hence, the layout editing application 121 determines whether characters corresponding to the calculated data amount (text amount) can be inserted in the container A having the width (horizontal direction) set as the basic pattern of the container A.

If it is determined that all characters can be inserted, the size (width and height) set by the basic pattern does not change in the container A. If it is determined that not all characters can be inserted, the container A expands in the horizontal direction because the height is fixed by setting the anchors. In this case, the layout editing application 121 calculates the width of the container A, which allows insertion of characters in the calculated amount, thereby calculating the size of the container A.

Next, the layout editing application 121 optimizes the layout such that the difference between the size of each container to be laid out and the actual contents size becomes as small as possible (step S903). The layout is optimized such that the difference between the size of the content to be inserted and the size of layout becomes as equal as possible between the containers associated with each other to dynamically change their sizes. The layout editing application 121 obtains the size of the container set selected in step S902, i.e., the total size of the container A, container B, and link 1106 (a fixed link in this case). Then, the layout editing application 121 calculates the difference between the total size and the size of the container set in the basic layout (in the example shown in FIG. 11, the size of the container set corresponds to the distance between the anchor icons of the containers A and B). If the width of the container A or B is increased by the calculation in the preceding step, a difference value is generated. The layout editing application 121 equally distributes the difference value to the elements of the container set, thereby adjusting the layout.

The layout editing application 121 optimizes the layout. If a violation of rules has occurred, calculation is executed again to prevent any violation of rules (step S904). The rules described here are constraints set by the user in creating the layout. Examples of the constraints are a constraint on the container size change range or container position, and for a flexible link, a constraint on the change in link length. When the layout is calculated without any violation of rules, the layout of the set is completed. The processing in steps S902 to S904 is executed for all sets on the page. With the processing, the layout editing application 121 calculates the layout of the entire page (step S905).

FIGS. 10A to 10C show a UI example in laying out containers without setting the priority order.

FIG. 10A shows a state in which data of certain records are inserted, and the layout is determined. Reference numerals 1001 and 1002 denote anchors; 1003 and 1004, fixed sides; 1005, a flexible side; 1006, an arrow which indicates the change direction of a flexible side; and 1008, a link. In this state, the records are changed, and contents having different sizes are inserted. Referring to FIG. 10B, the sizes of the new contents are superimposed on the state shown in FIG. 10A. Reference numeral 1009 denotes a size of the content to be inserted in each container. Layout calculation is executed. FIG. 10C shows the result of layout calculation. The sizes of the containers are calculated such that they have the same difference to the size of the content to be actually inserted, and no violation of the above-described rules occurs. As shown in FIG. 10C, the contents size (1009) to be inserted shown in FIG. 10B and a contents size (1010) after automatic layout processing have the same difference to the standard container size.

5. Description of Preview Display Window

A preview display window as a characteristic function of the layout editing application program 121 arranged in the host computer 101 according to this embodiment will be described on the basis of comparison to a prior art.

5-1 Preview Display Window

Figure 17:
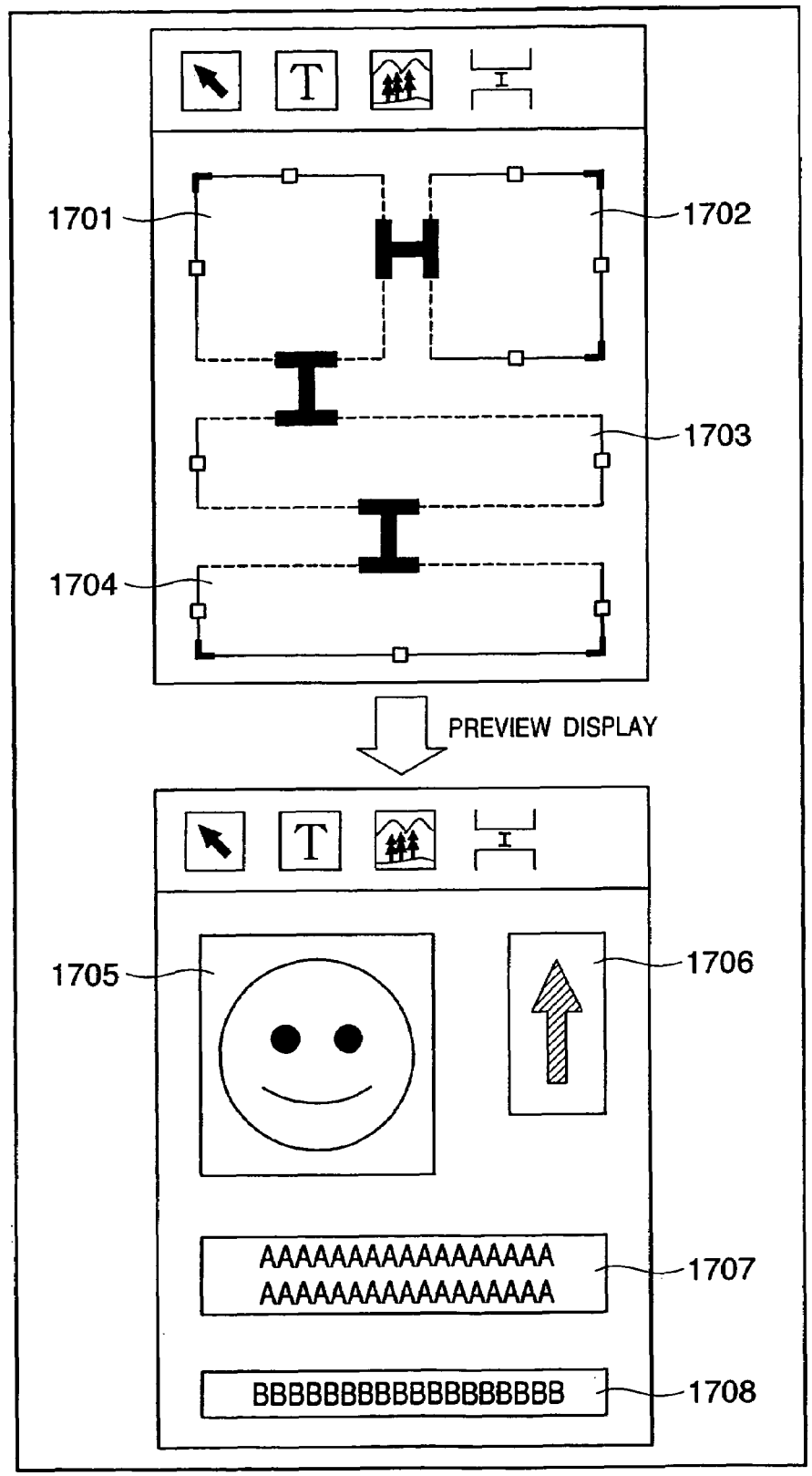
FIG. 17 is a view showing an example of a conventional preview display window.

FIG. 17 is a view showing an example of a conventional preview display window. When "preview" is selected in the document template display/editing window, contents data is inserted in each container, and the layout is calculated and displayed as a preview. In the example shown in FIG. 17, containers 1701 to 1704 are set. In the preview mode, image data are inserted in the containers 1701 and 1702, and text data are inserted in the containers 1703 and 1704. The layout changes, and containers 1705 to 1708 are displayed.

Assume that a layout result undesired by the user is displayed in the preview window. In this case, the user must return from the preview window to the document template display/editing window to correct the container layout or control condition setting. However, correction is difficult because the user cannot recognize the change in set container layout only in the preview display window. In this embodiment, characteristic preview display as shown in FIG. 18 is done.

Figure 18:
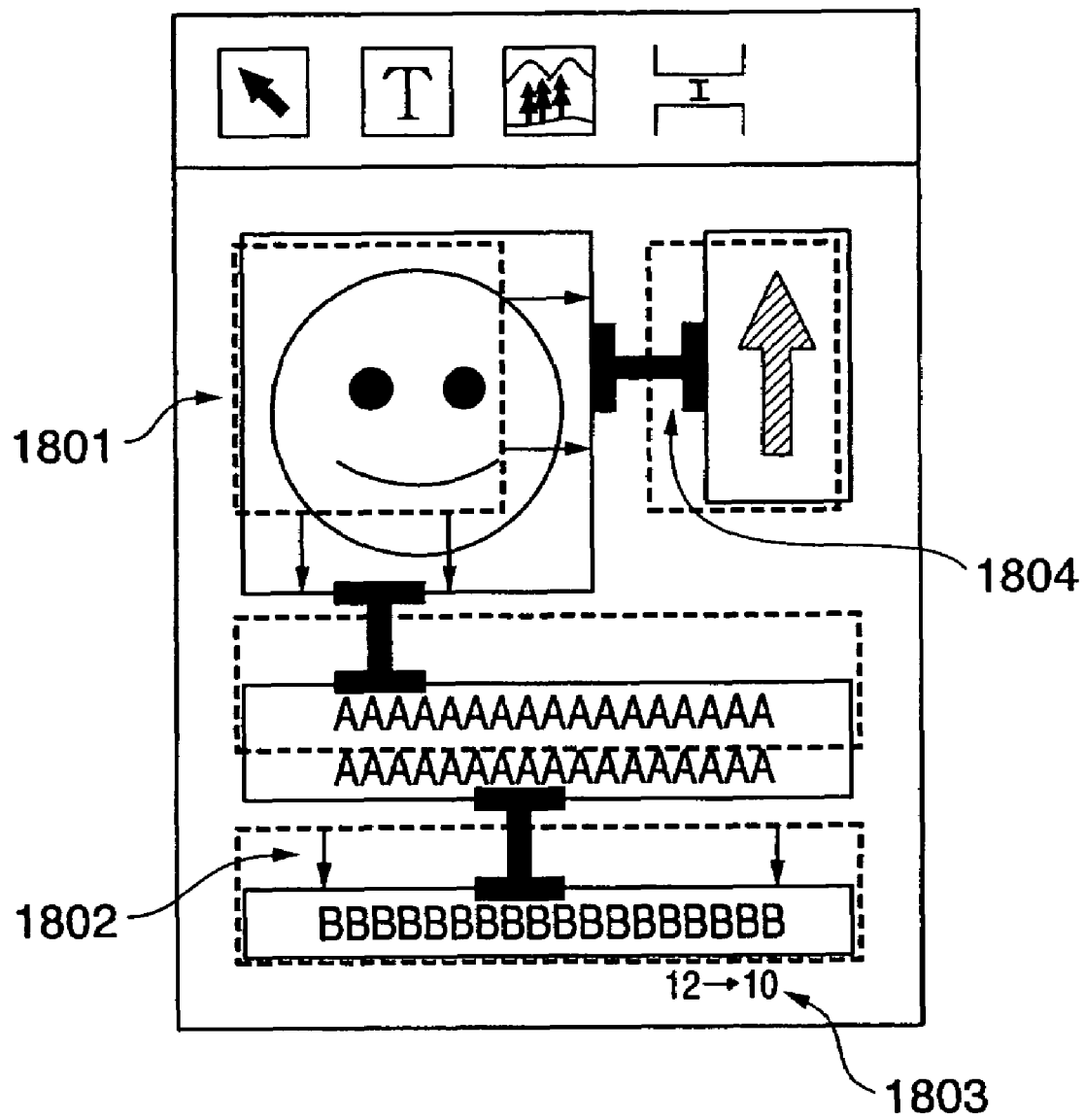
FIG. 18 is a view showing an example of layout check preview display by the host computer according to the first embodiment of the present invention.

FIG. 18 is a view showing an example of the preview display window in the host computer 101 according to this embodiment. As shown in FIG. 18, the following elements are displayed in addition to the normal preview display.

(1) A container 1801 drawn in the layout at the time of setting in the container setting window (before preview). The container 1801 has the standard size at the time of container setting.

(2) A symbol (e.g., an arrow 1802) to indicate the change from the original container size.

(3) A symbol (1803) to indicate the change from the original font size.

(4) A symbol (bar 1804) to indicate link setting between containers.

These elements are drawn on the preview display by using specific colors and lines to discriminate them from the preview window. For example, a frame line corresponding to the standard size of a container is drawn by, e.g., a red dotted line. With this arrangement, the user can intuitively understand the change from the original layout even during preview display. The preview including the symbols 1801 to 1804 in addition to the normal preview display will be referred to as "layout check preview" hereinafter.

5-2 Flow of Layout Check Preview Display Processing

Figure 19:
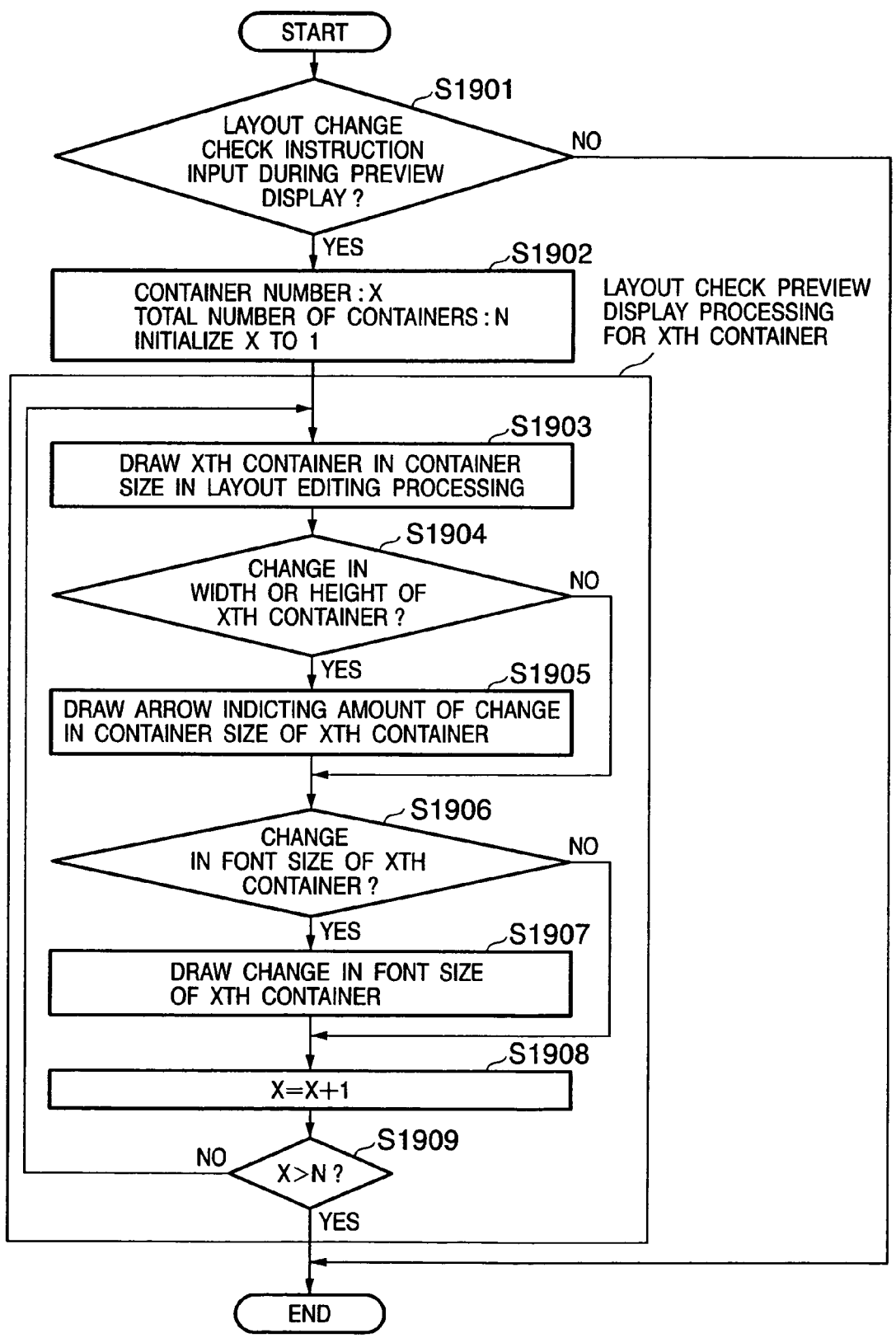
FIG. 19 is a flowchart showing the flow of layout check preview display processing by the host computer according to the first embodiment of the present invention.
Figure 26:
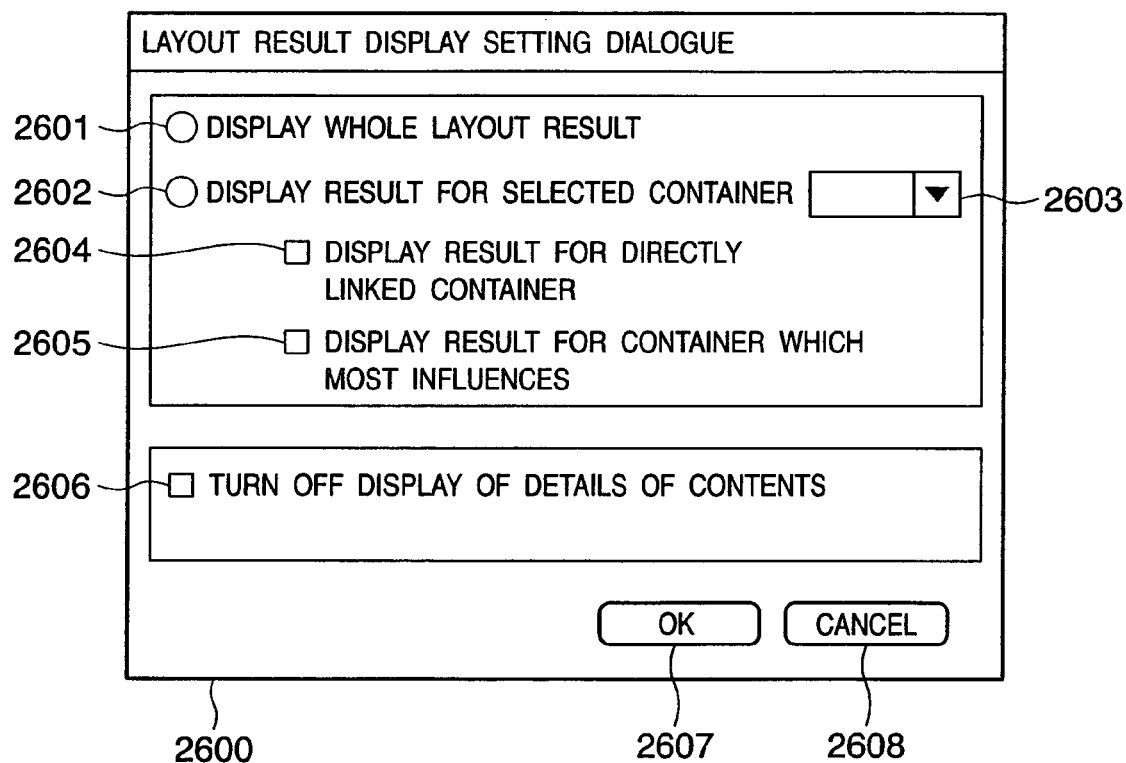
FIG. 26 is a view showing an example of a dialogue to cause a user to instruct layout check preview display in the first to fourth embodiments.

The flow of layout check preview display processing will be described next with reference to the flowchart in FIG. 19. This processing is executed by the processor 135 in the host computer. In step S1901, the layout editing application program 121 determines whether display of layout check preview shown in FIG. 18 is requested through the user interface 103 during normal preview display. FIG. 26 shows an example of a user interface used by the user to input the designation. For example, when an item "check layout change" is selected from the menu 304 during normal preview display, a dialogue 2600 shown in FIG. 26 is displayed. When the user inputs a designation in the dialogue 2600 and clicks on an OK button 2607, layout check preview is displayed. In FIG. 26, "display whole layout result" is selected.

As another designation method, the user may press an arbitrary keyboard button during preview. For example, when the "F2" key is pressed, the layout editing application program 121 receives the information through the user interface 103, processing of drawing the symbols 1801 to 1804 is executed by the layout engine 105, and layout check preview is displayed. The keyboard button to press may be determined arbitrarily in advance on the side of the layout editing application 121. Alternatively, a setting window may be provided to cause the user to arbitrarily set the keyboard button.

Referring back to FIG. 19, if YES in step S1901, the layout engine 105 initializes variables necessary for processing in step S1902. The containers are assigned numbers sequentially from 1. The number is set to X, and X is initialized to 1. The total number of containers is set to N.

In step S1903, the layout engine 105 draws the Xth container on the basis of the layout in layout editing processing.

In step S1904, the layout engine 105 determines for the Xth container whether its width or height has changed between the layout in layout editing processing and that after automatic layout processing.

If YES in step S1904, the layout engine 105 draws the symbol to indicate the change in container size in step S1905. For example, an arrow having a length corresponding to the change is drawn for each of the width and height, as shown in FIG. 18.

In step S1906, the layout engine 105 determines for the Xth container whether the font size has changed between the layout in layout editing processing and that after automatic layout processing.

If YES in step S1906, the layout engine 105 draws the change in font size in the Xth container in step S1907. For example, when the font size has changed from 12 to 10, "12→10" is drawn.

In step S1908, the layout engine 105 increments X by one. This processing is done to advance to processing of the next container.

In step S1909, the layout engine 105 determines whether X is larger than N. If NO in step S1909, an unprocessed container remains. The flow returns to step S1903.

In steps S1903 to S1909, the layout engine 105 draws a change of layout of the Xth container. This processing is also used in the flowcharts of the remaining embodiments.

As is apparent from the above description, according to this embodiment, the change of layout is drawn in the layout check preview display window. Hence, the user can recognize the difference between the layout in layout editing processing and that in automatic layout processing at a glance and easily correct the container layout or control condition setting.

Second Embodiment

In the first embodiment, the change of layout is drawn (1801 to 1804) for all containers in layout check preview. However, the present invention is not limited to this. The change of layout (1801 to 1804) may be drawn for only some of containers.

According to the first embodiment, the change in entire layout can be the recognized. However, when a plurality of containers are present, the change of layout is drawn (1801 to 1804) for all the containers. As a result, the entire layout check preview window may be complicated, resulting in difficulty in understanding. In addition, when information about only a specific container is necessary, drawing the change of layout for all containers is not preferable.

Figure 20:
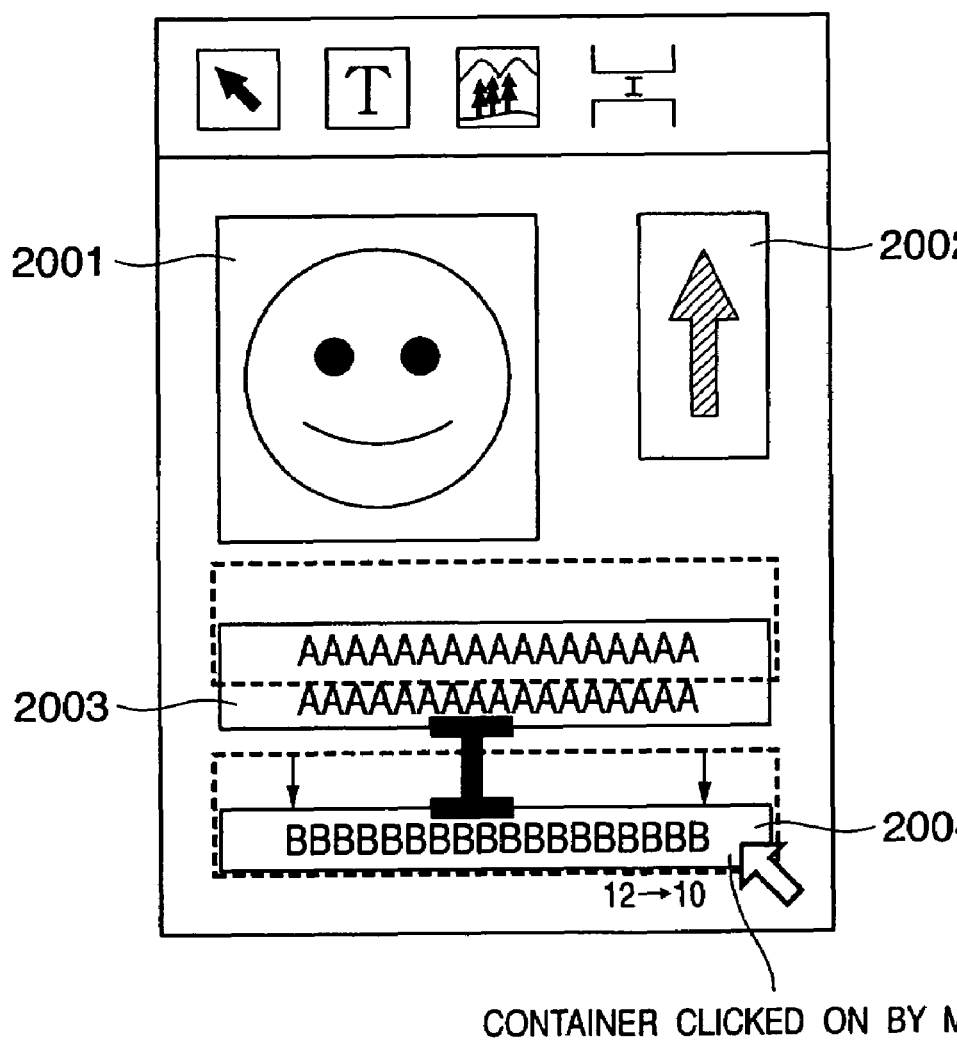
FIG. 20 is a view showing an example of layout check preview display by a host computer according to the second embodiment of the present invention.

The second embodiment takes these points into consideration. FIG. 20 shows layout check preview display according to this embodiment. Referring to FIG. 20, an arbitrary container (2004) is clicked on. In this case, a change of layout is drawn for the clicked container (2004) and a container (2003) directly associated with the container (2004) by a link (a change of layout is not drawn for containers 2001 and 2002 because no direct link is set between the container 2004 and the containers 2001 and 2002). According to this embodiment, when a container whose information is necessary is selected, a change of layout for only the designated container and containers in the neighborhood can be known.

Figure 21:
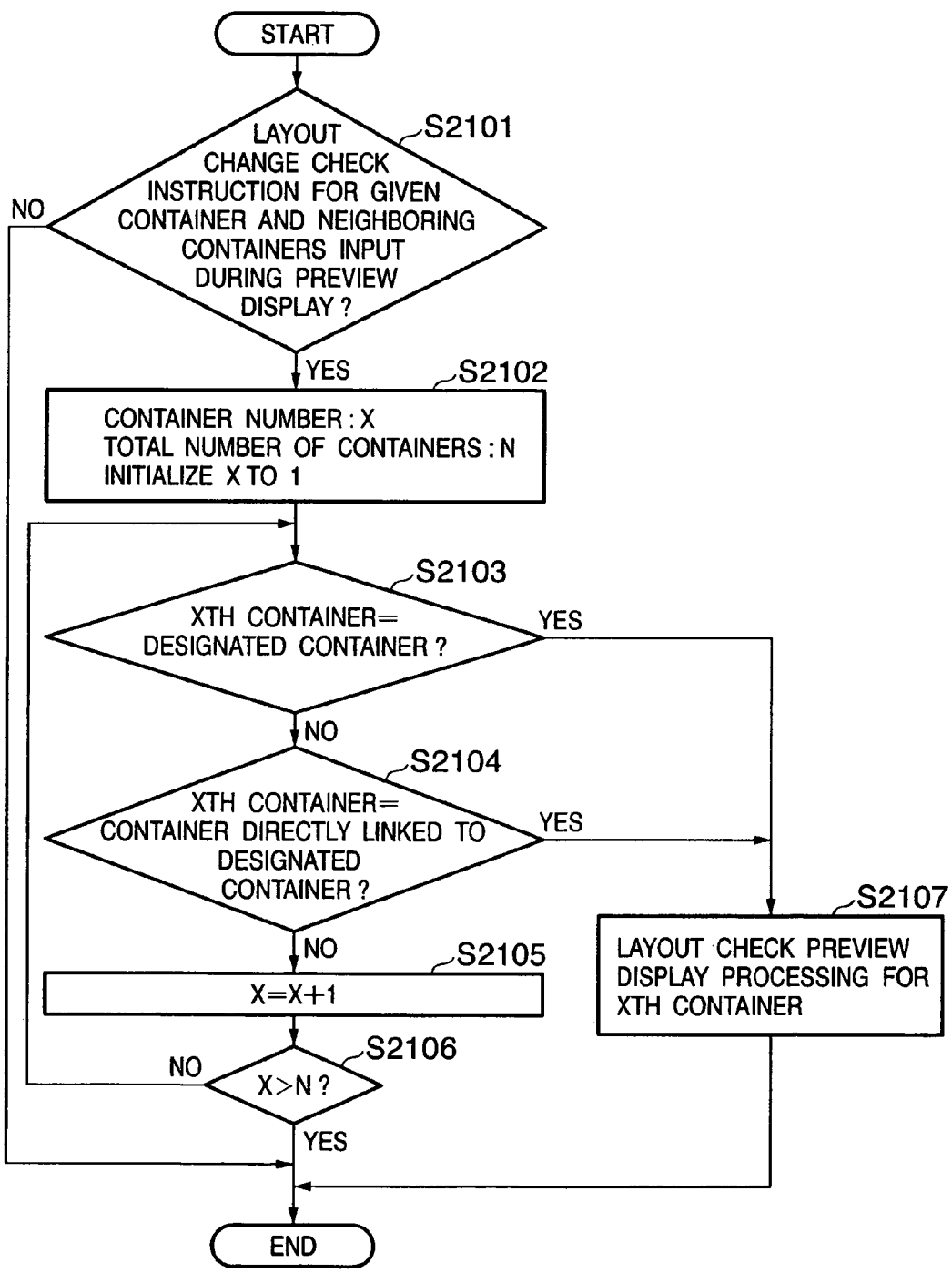
FIG. 21 is a flowchart showing the flow of layout check preview display processing by the host computer according to the second embodiment of the present invention.

The flow of layout check preview display processing according to this embodiment will be described next with reference to the flowchart in FIG. 21. The following processing is executed by a processor 135 in the host computer on the basis of a layout editing application program. In step S2101, a layout editing application program 121 determines whether a designation to draw a change of layout for the container (2004) designated as shown in FIG. 20 and the container (2003) having a direct link to the container (2004) is input through a user interface 103 during normal preview display. As a designation method, the arbitrary container (2004) is clicked on while pressing a keyboard button such as the "Shift" key. As another designation method, a container is selected and designated on a dialogue, as shown in FIG. 26. In FIG. 26, the user can do designation by checking "display result for selected container" (2602), selecting a container from a list box 2603, and selecting "display result for directly linked container" (2604).

If YES in step S2101, a layout engine 105 initializes variables necessary for processing in step S2102. This is the same as in step S1902.

In step S2103, the layout engine 105 determines whether the Xth container is the container designated in step S2101. The designated container indicates the container clicked on or selected from the list box 2603 in step S2101. In the example shown in FIG. 20, the designated container corresponds to the container 2004.

If NO in step S2103, the layout engine 105 determines whether the Xth container is directly linked to the container designated in step S2101. In the example shown in FIG. 20, the Xth container corresponds to the container 2003.

If YES in step S2103 or S2104, the layout engine 105 executes drawing processing for layout check preview display of the Xth container in step S2107. This processing is the same as in steps S1903 to S1909.

If NO in step S2104, the layout engine 105 increments the value X by one in step S2105.

In step S2106, the layout engine 105 determines whether X is larger than N. If NO in step S2106, the flow returns to step S2103. If YES in step S2106, the processing is ended.

Third Embodiment

In the second embodiment, the method of drawing a change of layout for a designated container and a container directly linked to it has been described. In the third embodiment, a method of drawing a change of layout for a designated container and a container which influences it most will be described.

In the second embodiment, a change of layout for a designated container and a container directly linked to it can be recognized. However, the most necessary information in correcting the layout or control condition setting of a designated container is a change of layout of a container which most influences the designated container. The most influential container is not always directly linked to the designated container and may be linked indirectly. In this case, the necessary information cannot be obtained by the method of the second embodiment. The indirectly linked container here indicates a container which is linked to a container having a link to the designated container. In the example shown in FIG. 17, containers 1701 and 1702 are indirectly linked to a container 1704.

Figure 22:
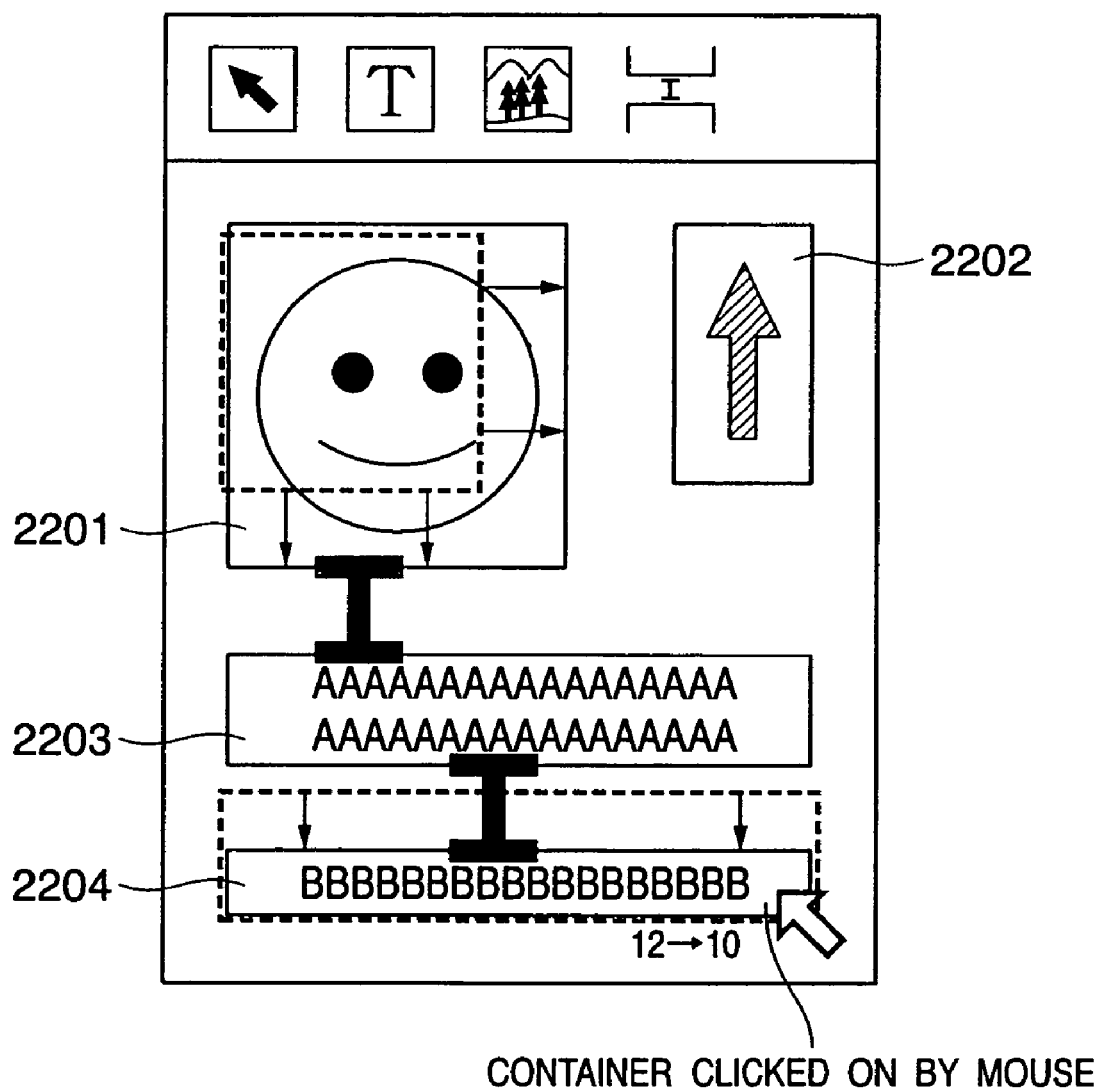
FIG. 22 is a view showing an example of layout check preview display by a host computer according to the third embodiment of the present invention.

The third embodiment takes this point into consideration. FIG. 22 shows layout check preview display according to this embodiment. Referring to FIG. 22, a change of layout is drawn for a container (2201) which most influences a container (2204) clicked on by the user (a change of layout is not drawn for remaining containers 2202 and 2203). With this arrangement, when the user wants to correct the layout of a designated container, he/she can recognize at a glance which container should be corrected in layout or control condition setting.

Figure 23:
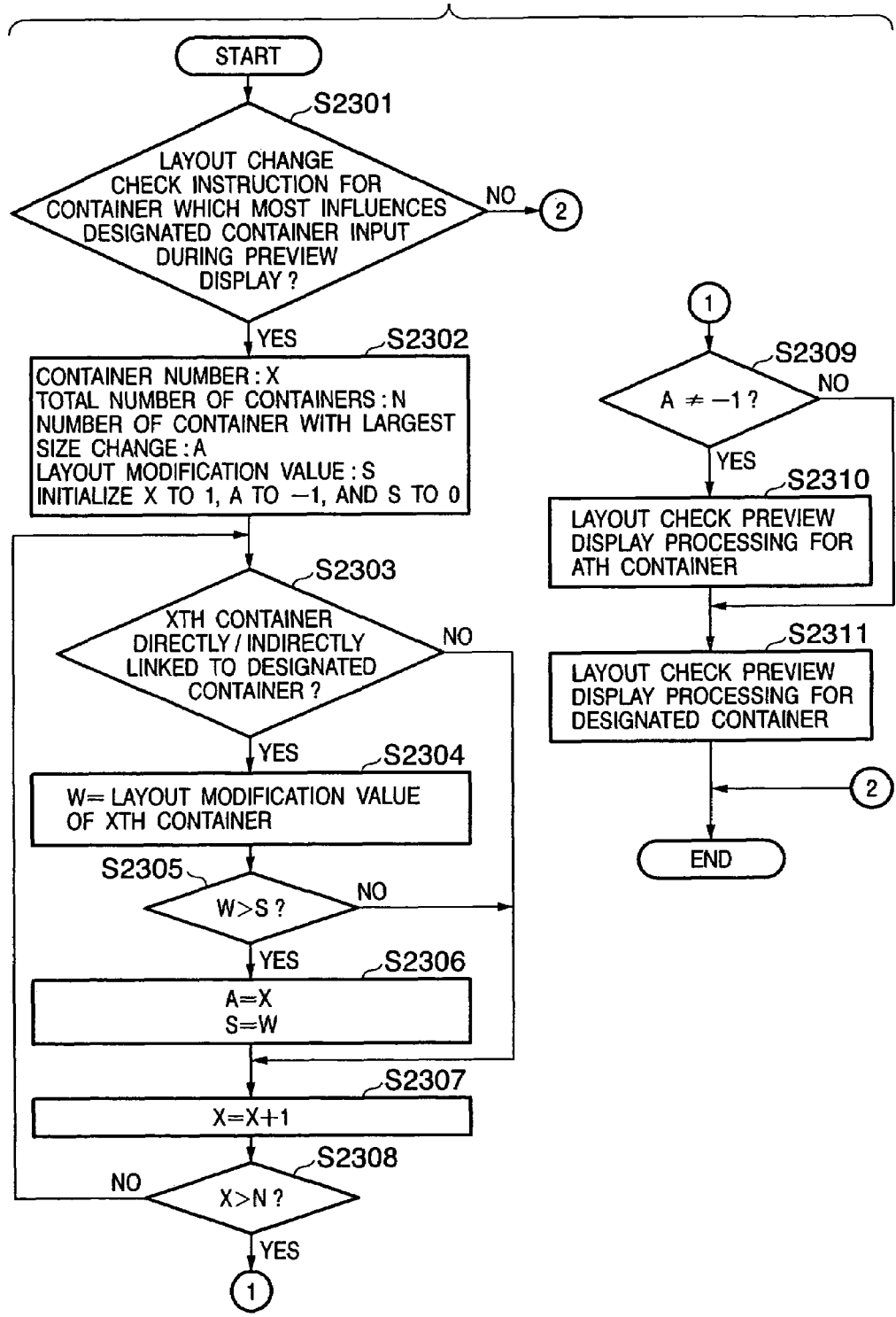
FIG. 23 is a flowchart showing the flow of layout check preview display processing by the host computer according to the third embodiment of the present invention.

The flow of layout check preview display processing according to this embodiment will be described next with reference to the flowchart in FIG. 23. The following processing is executed by a processor 135 in the host computer on the basis of a layout editing application program. In step S2301, a layout editing application program 121 determines whether a designation to draw a change of layout for the container (2204) designated as shown in FIG. 22 and the container (2201) which most influences the container (2204) is input through a user interface 103 during normal preview display. As a designation method, the user clicks on an arbitrary container while pressing a keyboard button such as the "Ctrl" key. As another designation method, the user selects and designates a container on a dialogue, as shown in FIG. 26. In FIG. 26, the user can do designation by checking "display the result for selected container" (2602), selecting a container from a list box 2603, and selecting "display the result for most influential container" (2605).

If YES in step S2301, a layout engine 105 initializes variables necessary for layout preview display processing in step S2302. The container number is set to X, and X is initialized to 1. The total number of containers is set to N. A flexible to store the number of a container whose size has changed most is set to A. A is initialized to −1. A layout modification value at that time is set to S. S is initialized to 0. The layout modification value indicates the degree of modification in container layout. A plurality of methods can be used to obtain this value. For example, a change in container area may simply be used. In this case, the value S can be obtained by $$S = |\text{area of container in preview} - \text{area of container in design}|$$

As another method, the differences in height and width of the containers are calculated and added. In addition, a number of methods are available.

Of containers which are directly or indirectly linked to the designated container, the container having the largest layout modification is determined as the container which most influences the designated container.

In step S2303, the layout engine 105 determines whether the Xth container is directly or indirectly linked to the container designated in step S2301.

If YES in step S2303, the layout engine 105 obtains the layout change value of the Xth container and stores it in a flexible W in step S2304. These data are stored in a storage unit (memory 136) in the host computer.

In step S2305, the layout engine 105 determines whether W (layout change value) is larger than S (layout modification value).

If YES in step S2305, the layout engine 105 stores the value X in A in step S2306. In addition, the value W is stored in S.

In step S2307, the layout engine 105 increments the value X by one.

In step S2308, the layout engine 105 determines whether X is larger than N. If NO in step S2308, the flow returns to step S2303.

By the processing in steps S2303 to S2308, the number of the container with the largest layout modification is stored in the flexible A. If A maintains the initial value of −1, the containers directly or indirectly linked to the container designated by the user in step S2301 include no container having a change of layout.

In step S2309, the layout engine 105 determines whether the value A is not −1. More specifically, this determination is done on the basis of the value A stored in the storage unit.

If YES in step S2309, the layout engine 105 draws a change of layout of the Ath container in step S2310. This is equivalent to "X=A" in steps S1903 to S1909 in FIG. 19.

In step S2311, the layout engine 105 draws a change of layout for the container designated in step S2301. This is equivalent to "X=designated container number" in steps S1903 to S1909 in FIG. 19.

Fourth Embodiment

In the first to third embodiments, a change of layout is superimposed on preview display. In the fourth embodiment, display of details of contents is turned off in layout check preview.

In the first to third embodiments, details of contents are also displayed in layout check preview display. However, when a plurality of containers are present, the preview display window may be complicated, resulting in difficulty in viewing it.

In checking a layout, only the layout of containers need to be displayed. Some users do not require details of contents.

Figure 24:
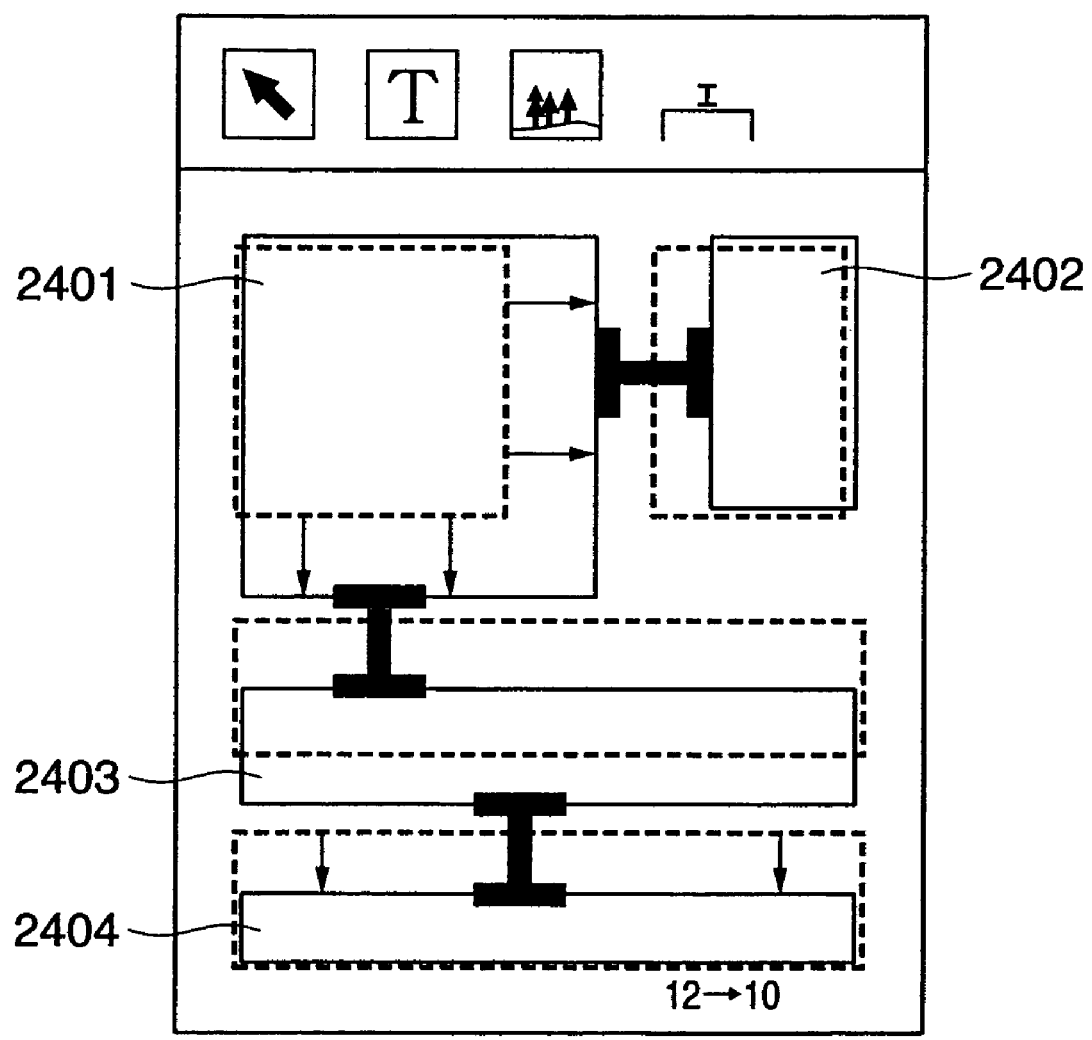
FIG. 24 is a view showing an example of layout check preview display by a host computer according to the fourth embodiment of the present invention.

As shown in FIG. 24, in layout check preview, display of details of contents is turned off, and only necessary information is displayed to easily see the window. Referring to FIG. 24, details of contents are not displayed, as compared to the first embodiment. Details of contents in containers 2401 to 2404 art not displayed. Since only the information of a change of layout is displayed, the window is easy to see. This method can also be applied to the second and third embodiments.

Figure 25:
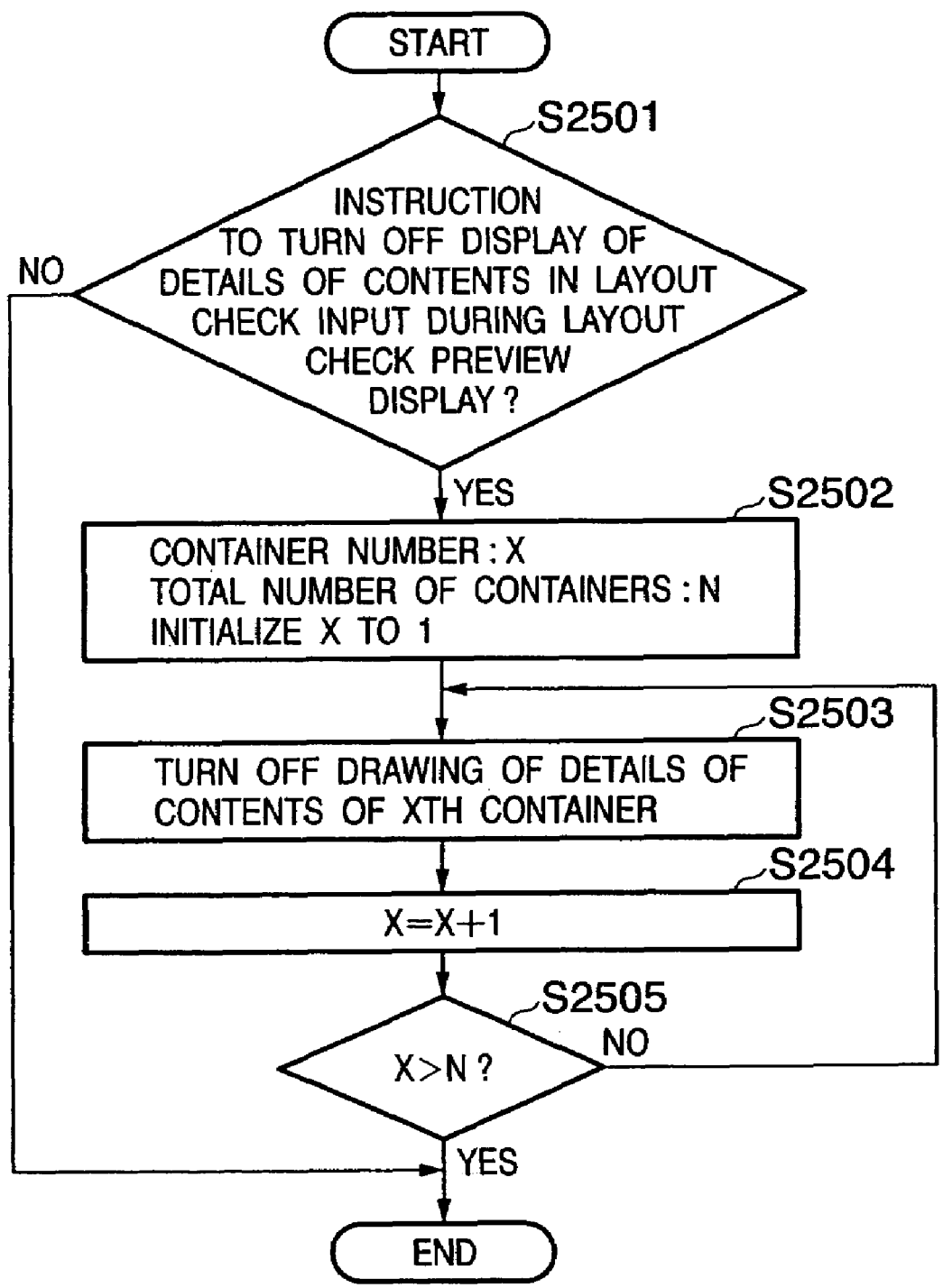
FIG. 25 is a flowchart showing the flow of layout check preview display processing by the host computer according to the fourth embodiment of the present invention.

The flow of layout check preview display processing according to this embodiment will be described next with reference to the flowchart in FIG. 25. The following processing is executed by a processor 135 in the host computer on the basis of a layout editing application program. In step S2501, a layout editing application program 121 determines whether a designation to turn off display of details of contents is input in layout check preview. As a designation method, the user presses a predetermined keyboard button such as the "F3" key during layout check preview display. Alternatively, the user may input a designation from a dialogue, as shown in FIG. 26. In FIG. 26, the user checks "turn off display of details of contents" (2606).

If YES in step S2501, a layout engine 105 initializes variables necessary for processing in step S2502. This is the same as in step S1902 in FIG. 19.

In step S2503, the layout engine 105 executes processing of turning off details of a content in the Xth container. This processing is done to only turn off display of contents data in the window. The inserted contents data is held in a storage unit in the host computer.

In step S2504, the layout engine 105 increments the value X by one.

In step S2505, the layout engine 105 determines whether X is larger than N. If NO in step S2505, the flow returns to step S2503. With the processing in steps S2502 to S2505, display of details of contents in all containers is turned off.

The user can change the template generated on the document template in FIG. 3 by referring to the change before and after layout control, which is displayed by using the present invention. For example, when a container having a large change amount is specified by using the present invention, setting of the size attribute (e.g., maximum value) of the container with the large change amount can be changed such that the change amount becomes small.

Other Embodiment

The present invention may be applied to a system including a plurality of devices (e.g., a host computer, interface device, reader, and printer) or an apparatus including a single device (e.g., a copying machine or facsimile apparatus).

The object of the present invention is achieved even by supplying a storage medium which records software program codes to implement the functions of the above-described embodiments to the system or apparatus causing the computer (or CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium to supply the program codes, for example, a floppy (registered trademark) disk, hard disk, optical disk, magnetooptical disk, CD-ROM, CD-R, magnetic tape, nonvolatile memory card, or ROM can be used.

The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

With the above-described processing, in the automatic layout system for automatically settling layout in accordance with inserted contents data, a container having a standard size is displayed to make the user recognize a change in preset layout, which has occurred when contents data is inserted. Hence, the user can recognize the change of layout and also grasp the reason why the change has occurred. Hence, even when a layout undesired by the user is created, it can easily be corrected.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2004-252896 filed on Aug. 31, 2004, which is hereby incorporated by reference herein.

What is claimed is:

1. An information processing apparatus, comprising:
a lay out unit adapted to lay out a plurality of data areas in which contents data is inserted, in accordance with a standard size and a standard position set by user;
a changing unit adapted to change size and position of the plurality of data areas laid out in accordance with the standard size and the standard position based on the contents data when the contents data is inserted in the plurality of data areas; and
a display control unit adapted to display preview image on which (1) the plurality of data areas laid out in accordance with the standard size and the standard position and (2) the plurality of data areas for which the size and the position are changed by said changing unit are overlapped such that user can recognize changing amount of the plurality of data areas laid out in accordance with the standard size and the standard position.

2. The information processing apparatus according to claim 1, wherein the display control unit further displays, when the inserted contents data is character data, a change in font size of the character data before and after data insertion.

3. An information processing method, comprising,
the following steps executed by a computer:
a lay out step of laying out a plurality of data areas in which contents data is inserted, in accordance with a standard size and a standard position set by user;

a changing step of changing size and position of the plurality of data areas laid out in accordance with the standard size and the standard position based on the contents data when the contents data is inserted in the plurality of data areas; and a display control step of displaying preview image on which (1) the plurality of data areas laid out in accordance with the standard size and the standard position and (2) the plurality of data areas for which the size and the position are changed by said changing step are overlapped such that user can recognize changing amount of the plurality of data areas laid out in accordance with the standard size and the standard position.

4. The information processing method according to claim 3, wherein, when the inserted contents data is character data, a change in a font size of the character data before and after being inserted is further displayed in said display control step.

5. A computer-readable medium storing a program which causes a computer to execute an information processing method, wherein the information processing method comprises:

a lay out step of laying out a plurality of data areas in which contents data is inserted, in accordance with a standard size and a standard position set by user;

a changing step of changing size and position of the plurality of data areas laid out in accordance with the standard size and the standard position based on the contents data when the contents data is inserted in the plurality of data areas; and a display control step of displaying preview image on which (1) the plurality of data areas laid out in accordance with the standard size and the standard position and (2) the plurality of data areas for which the size and the position are changed by said changing step are overlapped such that user can recognize changing amount of the plurality of data areas laid out in accordance with the standard size and the standard position.

6. The computer readable medium according to claim 5, wherein when the inserted contents data is character data, a change in font size of the character data before and after data insertion is further displayed in said display control step.

* * * * *